(12) United States Patent
Kramer et al.

(10) Patent No.: US 12,089,778 B2
(45) Date of Patent: Sep. 17, 2024

(54) DUAL CAVITY COOKING SYSTEM

(71) Applicant: SharkNinja Operating LLC, Needham, MA (US)

(72) Inventors: Ethan S. Kramer, Allston, MA (US); Robert J. Bone, III, Stoughton, MA (US); Andrew David Zdeblick, Reading, MA (US)

(73) Assignee: SharkNinja Operating LLC, Needham, MA (US)

( * ) Notice: Subject to any disclaimer, the term of this patent is extended or adjusted under 35 U.S.C. 154(b) by 32 days.

(21) Appl. No.: 17/747,520

(22) Filed: May 18, 2022

(65) Prior Publication Data

US 2023/0371743 A1  Nov. 23, 2023

(51) Int. Cl.
*A47J 37/06* (2006.01)
*F24C 15/02* (2006.01)

(52) U.S. Cl.
CPC ......... *A47J 37/0629* (2013.01); *F24C 15/028* (2013.01)

(58) Field of Classification Search
None
See application file for complete search history.

(56) References Cited

U.S. PATENT DOCUMENTS

| | | | |
|---|---|---|---|
| 1,951,698 A * | 3/1934 | Lee | F24C 15/023 126/190 |
| 5,155,318 A | 10/1992 | Bowen | |
| 5,204,503 A | 4/1993 | Maiellano, Jr. et al. | |
| 5,272,302 A | 12/1993 | Dudley et al. | |
| 6,414,287 B2 | 7/2002 | Han et al. | |
| 7,104,546 B2 | 9/2006 | Bono, Jr. | |
| 7,348,527 B2 | 3/2008 | Braunisch et al. | |
| 7,368,686 B2 | 5/2008 | Etheredge et al. | |
| 7,735,836 B2 | 6/2010 | Bono, Jr. | |
| 8,490,333 B2 | 7/2013 | Gholap et al. | |
| D710,644 S | 8/2014 | Kim et al. | |

(Continued)

FOREIGN PATENT DOCUMENTS

| | | |
|---|---|---|
| CA | 159221 S | 7/2015 |
| CA | 2951634 C | 12/2019 |

(Continued)

*Primary Examiner* — Jason Lau
(74) *Attorney, Agent, or Firm* — Mintz, Levin, Cohn, Ferris, Glovsky and Popeo, P.C.

(57) ABSTRACT

A cooking system is provided. In one embodiment, the cooking system includes a housing having a first internal heating compartment having a first opening, and a second internal heating compartment having a second opening. A first heating element is configured to heat the first internal heating compartment, and a second heating element is configured to heat the second internal heating compartment. The system further includes a door assembly having a first door configured to cover the first opening, a second door configured to cover the second opening, a first frame member, and a second frame member. The second door is pivotally arranged relative to the first door and is configured to selectively allow access to the second internal heating compartment while the first door covers the first opening, and the second door selectively locks to the first frame member and the second frame member.

14 Claims, 26 Drawing Sheets

(56) References Cited

U.S. PATENT DOCUMENTS

| | | |
|---|---|---|
| 9,222,678 B2 | 12/2015 | Venkatakrishnan |
| D755,007 S | 5/2016 | Lee et al. |
| 9,377,203 B2 | 6/2016 | Armstrong et al. |
| 9,447,628 B2 | 9/2016 | Qiang et al. |
| 9,513,015 B2 | 12/2016 | Estrella et al. |
| D778,670 S | 2/2017 | Lee et al. |
| 9,683,747 B2 | 6/2017 | Raghavan et al. |
| D793,149 S | 8/2017 | Lee et al. |
| 10,024,547 B2 | 7/2018 | Johnson et al. |
| 10,234,145 B2 | 3/2019 | Chadwick et al. |
| 10,247,424 B2 | 4/2019 | Adelmann et al. |
| 10,364,991 B2 | 7/2019 | Kang et al. |
| 10,364,992 B2 | 7/2019 | Rand et al. |
| 10,448,464 B2 | 10/2019 | Wittmann et al. |
| 10,488,054 B2 | 11/2019 | Johnson |
| 10,502,433 B2 | 12/2019 | Park et al. |
| 10,523,851 B2 | 12/2019 | Armstrong |
| 10,598,390 B2 | 3/2020 | Carcano et al. |
| 10,598,391 B2 | 3/2020 | Padula |
| 10,599,168 B2 | 3/2020 | Raghavan et al. |
| 10,677,473 B2 | 6/2020 | Stephens et al. |
| 10,688,327 B2 | 6/2020 | Johnson et al. |
| 10,704,789 B2 | 7/2020 | Scalf |
| 10,805,991 B2 | 10/2020 | Li et al. |
| 10,961,755 B2 | 3/2021 | Oh et al. |
| 11,078,697 B2 | 8/2021 | Ham et al. |
| 11,092,343 B2 | 8/2021 | Raghavan et al. |
| 2013/0291853 A1* | 11/2013 | Braden ............... F24C 15/023 312/326 |
| 2014/0048058 A1* | 2/2014 | Donarski ............. F24C 3/087 126/39 BA |
| 2014/0097172 A1* | 4/2014 | Kang .................. F24C 7/002 219/394 |
| 2015/0101586 A1 | 4/2015 | Armstrong et al. |
| 2015/0323196 A1 | 11/2015 | Chadwick et al. |
| 2017/0257913 A1 | 9/2017 | Vengroff et al. |
| 2018/0023817 A1 | 1/2018 | Johnson et al. |
| 2018/0152996 A1 | 5/2018 | Carcano et al. |
| 2019/0008004 A1 | 1/2019 | Wild |
| 2020/0103121 A1 | 4/2020 | Haghdoost et al. |
| 2020/0217514 A1 | 7/2020 | Clayton et al. |
| 2020/0309379 A1 | 10/2020 | Paller |
| 2021/0161151 A1 | 6/2021 | Thorogood et al. |
| 2021/0262671 A1 | 8/2021 | Lee et al. |
| 2021/0262674 A1 | 8/2021 | Johnson et al. |
| 2021/0388992 A1 | 12/2021 | Thorogood et al. |

FOREIGN PATENT DOCUMENTS

| | | |
|---|---|---|
| CN | 101261016 A | 9/2008 |
| CN | 101713555 A | 5/2010 |
| CN | 101737832 A | 6/2010 |
| CN | 102589017 A | 7/2012 |
| CN | 102589017 B | 12/2014 |
| CN | 104990111 A | 10/2015 |
| CN | 106918058 A | 7/2017 |
| CN | 104990111 B | 10/2017 |
| CN | 107242806 A | 10/2017 |
| CN | 109602291 A | 4/2019 |
| CN | 110192429 A | 8/2019 |
| CN | 110313217 A | 10/2019 |
| CN | 209489913 U | 10/2019 |
| CN | 209899163 U | 1/2020 |
| CN | 106662336 B | 3/2020 |
| CN | 110856619 A | 3/2020 |
| CN | 110960109 A | 4/2020 |
| CN | 110996668 A | 4/2020 |
| CN | 111051778 A | 4/2020 |
| CN | 111395868 A | 7/2020 |
| CN | 112450743 A | 3/2021 |
| CN | 112617623 A | 4/2021 |
| CN | 112971551 A | 6/2021 |
| CN | 215383297 U | 1/2022 |
| DE | 102015225581 A1 | 6/2017 |
| EP | 2177836 A1 | 4/2010 |
| EP | 1763286 B1 | 6/2011 |
| EP | 2177836 B1 | 7/2012 |
| EP | 3155323 B1 | 7/2019 |
| EP | 3549390 A1 | 10/2019 |
| EP | 3568639 A2 | 11/2019 |
| EP | 2553344 B1 | 1/2020 |
| EP | 3658825 A4 | 7/2020 |
| EP | 3390916 B1 | 2/2021 |
| EP | 3644746 A4 | 6/2021 |
| EP | 3861258 A1 | 8/2021 |
| EP | 3869105 A1 | 8/2021 |
| KR | 20110055076 A | 5/2011 |
| WO | 2011121506 A1 | 10/2011 |
| WO | 2013135528 A1 | 9/2013 |
| WO | 2017102494 A1 | 6/2017 |
| WO | 2019045318 A1 | 3/2019 |
| WO | 2019045453 A1 | 3/2019 |

* cited by examiner

DUAL CAVITY COOKING SYSTEM

FIELD

The present disclosure relate generally to a cooking system, and more particularly, to a dual cavity cooking system.

BACKGROUND

Existing cooking systems, such as ovens and toasters, may be used to conveniently warm or cook food. In conventional cooking systems, food is typically positioned within a single internal chamber of the cooking system. However, these single cavity cooking systems prevent different types of cooking operations to be performed simultaneously. Additionally, if different temperatures are required to cook two different food items, a user would have to estimate and guess the proper time to remove a food item from the cooking system to prevent burning, which can lead to undercooking of the food item.

Current dual cavity ovens are large cooking devices which cannot be placed on a counter, and also include two identical large cooking chambers that are covered by a complex door assembly.

Accordingly, there is a need for a dual cavity cooking system which allows for different cooking methods to be performed simultaneously while also simplifying the design to allow the cooking system to be arranged on a countertop.

SUMMARY

Cooking systems having a dual cavities for cooking food are provided.

In one embodiment, a cooking system is provided having a housing, a first heating element, a second heating element, and a door assembly. The housing can include a first internal heating compartment having a first opening and a second internal heating compartment having a second opening. The first heating element can be configured to heat the first internal heating compartment. The second heating element can be configured to heat the second internal heating compartment. The door assembly can include a first door, a second door, a first frame member, and a second frame member. The first door can be configured to cover the first opening. The second door can be configured to cover the second opening. The first frame member can extend between the first door and the second door and the second frame member can extend between the first door and the second door, where the second door can be pivotally arranged relative to the first door and can be configured to selectively allow access to the second internal heating compartment while the first door covers the first opening. The second door can selectively lock to the first frame member and the second frame member.

The first door can have a variety of configurations. For example, in some embodiments, the first door can be pivotally connected to the housing. In other embodiments, the first door can include a tab configured to limit a rotational angle of the second door relative to the first door.

The second door can have a variety of configurations. For example, in some embodiments, the second door can be positioned vertically above the first door. In other embodiments, the second door can be pivotally connected to the first door. In certain embodiments, the second door can comprise a first locking projection configured to extend into the first frame member, and a second locking projection configured to extend into the second frame member. In other embodiments, the second door can include a button configured to selectively release the second door from the frame.

The frame member can have a variety of configurations. For example, in some embodiments, the first frame member and second frame member can be separate from the housing. In other embodiments, the first frame member can be positioned within a channel of the first door. In certain embodiments, the first frame member can be positioned within a channel of the second door. In other embodiments, the first frame member and the second frame member arranged on opposite sides of the first door. In certain embodiments, the first frame member and the second frame member can extend vertically above a top surface of the first door and can be positioned on opposite sides of the second door.

In some embodiments, the first heating element can be a convection and/or radiation heating assembly arranged in a chamber positioned adjacent to the first internal heating compartment. In some embodiments, the second heating element can be a convention and/or radiation heating element positioned within the second internal heating compartment.

In another embodiment, a door assembly is provided. The door assembly includes a first door, a frame member, and a second door. The first door can be configured to pivotally connect to a housing and can include a channel positioned within the first door, and a top edge surface extending from the channel. The frame member can have a locking aperture and can be positioned within the channel and extend upward above the top edge surface, where the frame member is separate from the housing. The second door can be pivotally connected to the first door and can include a channel positioned within the second door and configured to receive the frame member. A locking projection can be configured to extend into the locking aperture of the frame member to selectively lock the second door to the frame member.

The second door can have a variety of configurations. For example, in some embodiments, the second door can be pivotally secured to the first door by a bracket extending downward from the second door and into the first door below the top edge surface. In other embodiments, the second door can include a button arranged thereon and can be configured to selectively actuate the locking projection within the locking aperture of the frame member. In certain embodiments, the locking projection can extend into the channel of the second door.

The first door can have a variety of configurations. For example, in some embodiments, the channel of the first door can include a first channel positioned on a first edge portion of the first door, and a second channel can be positioned on a second edge portion, opposite the first edge portion of the first door. In other embodiments, the first door can include a tab configured to contact the bracket of the second door to limit a rotational angle of the second door relative to the first door.

BRIEF DESCRIPTION OF THE FIGURES

These and other features will be more readily understood from the following detailed description taken in conjunction with the accompanying drawings, in which.

Figure 1:
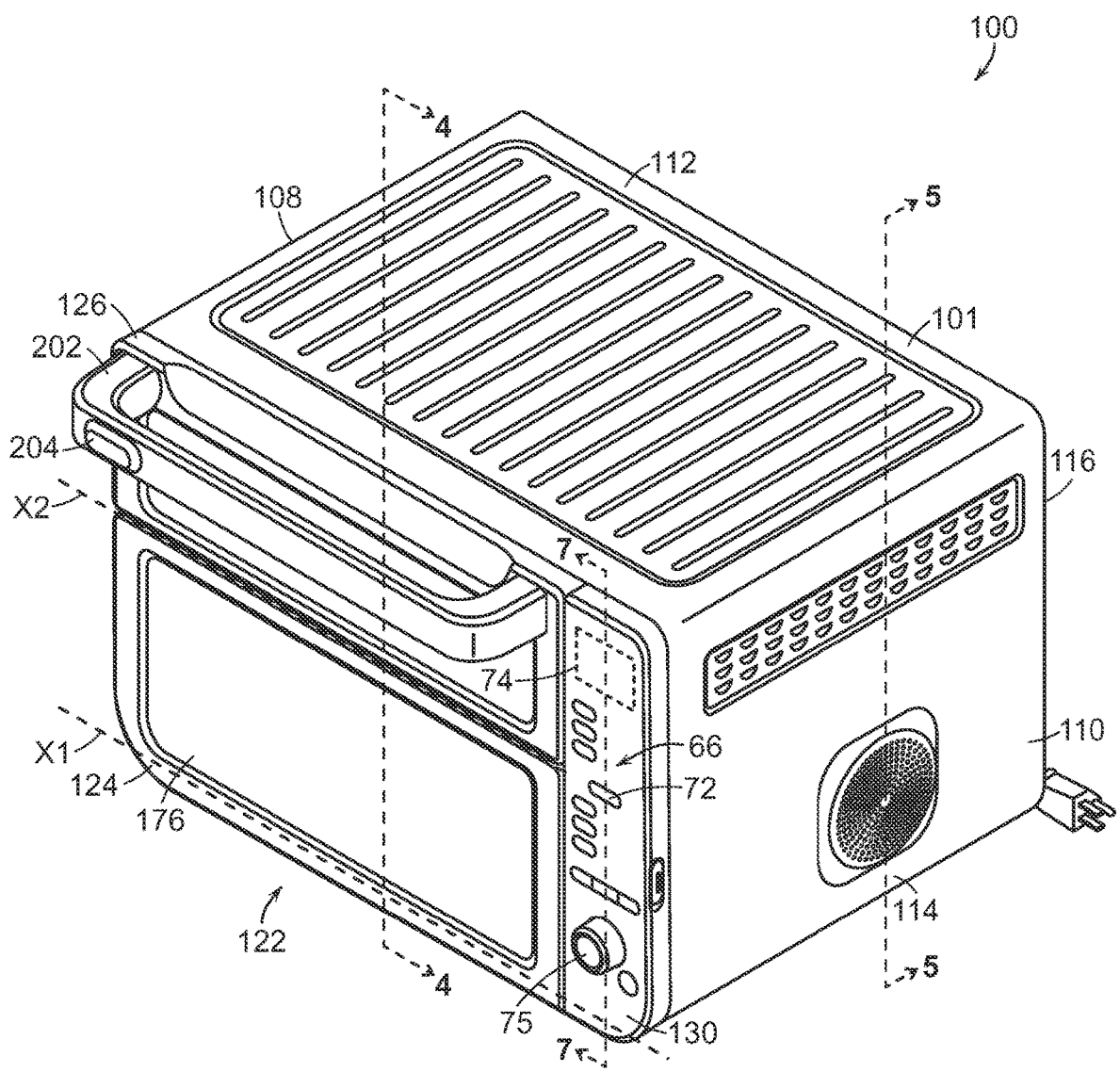
FIG. 1 is a front perspective view of one embodiment of a cooking system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A cooking system is provided having multiple cooking compartments in order to achieve multiple cooking operations simultaneously. In one aspect, the cooking system includes a first internal cooking compartment having a first heating element, and a second internal heating compartment having a second heating element. The first and second internal heating compartments are separate and thermally insulated from one another other. Therefore, the cooking system includes multiple cooking compartments where the first heating compartment can be, for example, an air fryer and/or roaster, and the second heating compartment can be, for example, a toaster oven. Each of the internal heating compartments includes an opening which allows access to the heating compartment. A single door assembly is configured to be arranged over the openings in order to thermally seal the first and second heating compartments. The door assembly includes a first door and a second door, where the second door can be opened to access the second internal heating compartment without opening the first door to access the first internal heating compartment. The ability to access the second heating compartment without opening the first heating compartment leads to increased thermally efficiency while both heating compartments are active. Additionally, the heating elements within the first and second compartments can share power in order to achieve a higher efficiency, by directing up to 100% of available wattage to only one of the heating compartments. Accordingly, the cooking system can perform multiple cooking operations simultaneously to cook different foods at different temperatures, while allowing a user to access only the second internal heating compartment or both heating compartments.

FIGS. 1-5 illustrate one exemplary embodiment of a cooking system 100 configured to be positioned on a support surface, such as a countertop. The illustrated cooking system 100 generally includes a thermally insulated housing 101 that defines a first internal heating compartment 104 and a second, separate internal heating compartment 106. The housing 101 can be formed from a left exterior sidewall 108, a right exterior sidewall 110, a top exterior wall 112, a bottom exterior wall 114, and a rear exterior wall 116. The exterior walls 108, 110, 112, 114, 116 can be connected to form of a hollow box, where the internal heating compartments 104, 106 are defined therein. In one aspect, the exterior walls 108, 110, 112, 114, 116 can be formed from stamped sheet metal secured together. The housing 101 can also include other features, such as support feet arranged on the bottom exterior wall 114, where the cooking system 100 remains in an operational position at all times.

As mentioned above, the housing 101 can define a first internal heating compartment 102 and a second internal heating compartment 104. In one aspect, the second internal heating compartment 104 is vertically aligned with the first internal heating compartment 102 such that the second internal heating compartment 104 is positioned vertically above the first internal heating compartment 102. The first internal heating compartment 102 can be accessible through a first opening 118 in the housing 101, and the second internal heating compartment 102 can be accessible through a second opening 120 in the housing 101.

In order to seal the openings 118, 120 of the internal heating compartments 102, 104 for thermal efficiency, the housing 101 can include a front wall through which the internal heating compartments 102, 104 are accessed by a user. The front wall of the housing 101 may be formed as a moveable door assembly 122 that can be movable along a hinge axis X1 relative to the remainder of the housing 101 to selectively provide access to the internal heating compartments 102, 104. The illustrated door assembly 122 is in the form of a rectangular plate mounted in overlapping arrangement with the openings 118, 120 in the housing 101 to seal the internal heating compartments 102, 104. The door assembly 122 includes a first door 124, and a second door 126, which will be described in more detail below. In one aspect, in order to further seal the internal heating compartment, gaskets can be arranged on the inside surface of the door assembly 122 or the surrounding surface of the openings 118, 120, which can be contacted when the door assembly 122 is in a closed position.

Figure 2:
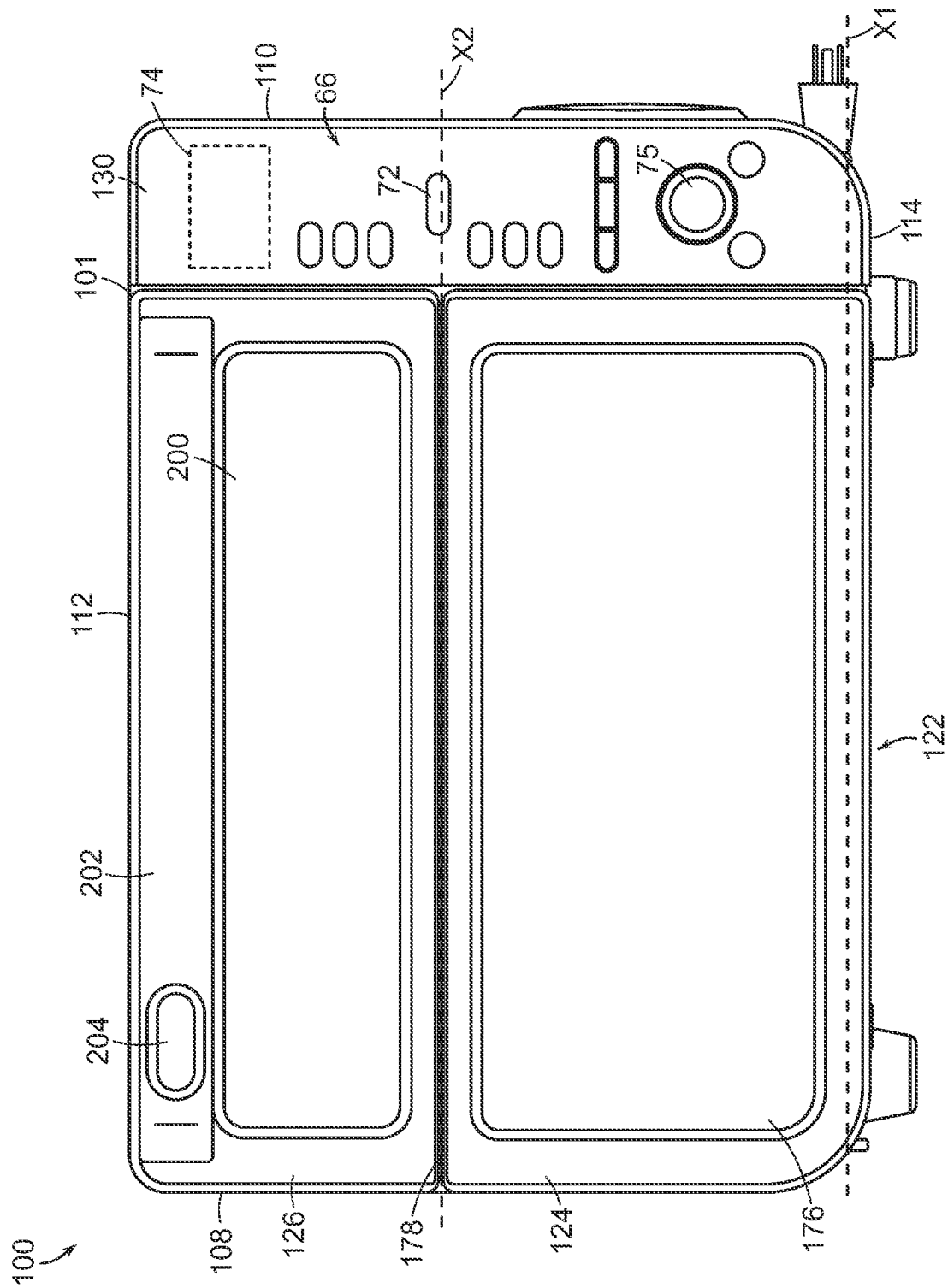
FIG. 2 is a front view of the cooking system of FIG. 1.

In one aspect, the door assembly 122 may define the entire front wall of the housing 101. However, in other aspects, the door assembly 122 may define only a portion of the front wall, and the front wall may further include a panel 130 located adjacent to one or more sides of the door assembly 122. As illustrated in FIGS. 1 and 2, the panel 130 is positioned adjacent the right exterior sidewall 110, and extend between the top and bottom exterior walls 112, 114, respectively of the housing 101. It should be understood that the panel 130 can be located anywhere on the housing 101.

As illustrated in FIGS. 1-3 and 8, a user interface 66 can be arranged on the panel 130 for operating the cooking system 100. The user interface 66 can be part of a control system 70 that is electrically connected to various powered components within the cooking device. The illustrated user interface 66 includes one or more inputs 72 associated with operating the cooking system 20 and for selecting various modes of operation of the cooking system 20. One or more of the inputs 72 may include a light or other indicator to show that the respective input 72 has been selected. The user interface 66 may additionally include a display 74 separate from and associated with the at least one input 72. However, embodiments where the display 74 is integrated into the at least one input 72 are also contemplated herein. Also arranged on the panel 130 is a dial 75 which can be configured to input user selections.

In one aspect, at least one input 72 on the user interface 66 is an on/off button or switch which allows the user to activate or deactivate the user interface 66. When the user interface 66 is deactivated, none of the heating elements or air movement device are energized. The at least one input 72 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the user interface 66. One or more of the other inputs 72, such as the dial 75, may be operable, such as by pushing the dial 75 towards the user interface 66, to start and stop operation of the cooking system 20, regardless of whether the cooking system 100 is following a stored sequence or is in a manual mode.

The one or more inputs 72 can be operable to initiate operation of the cooking system 100 in a plurality of cooking modes. Examples of modes of operation of the cooking system 100 include, but are not limited to, toast, bake, broil, grill, warm, reheat, and steam cook. As explained in detail below, independent control of heating elements allows a user to configure a cooking/heating cycle based on the type of food item positioned within the internal heating compartments 102, 104.

Additionally, the at least one input 72 is operable to select one or more manual modes of operation of at least one of the heating elements. Alternatively, or in the alternative, the at least one input 72 can be operable to select a stored sequence of operation of at least one heating element. In some cases, the stored sequences may be particularly well suited for a given method of food preparation and/or for particular ingredients or types of ingredients. The plurality of stored sequences associated with the at least one input 72 may be stored within a memory accessible by the processor 76. Alternatively, the plurality of stored sequences may be stored remotely from the cooking system 20, and may be accessed by the processor 76, such as via wireless communication.

In addition, a user may be able to enter or select a time associated with operation of the cooking system 100 in a desired manual mode. The time may be entered via the same input 72, or a separate input 72 as used to select a mode of operation. Where the cooking system 20 is in a mode configured to perform a stored sequence in response to selection of one of the inputs, the display 74 may indicate a time remaining. Temperature or other parameters, such as toasting color for example, may also be entered via inputs 72.

Figure 8:
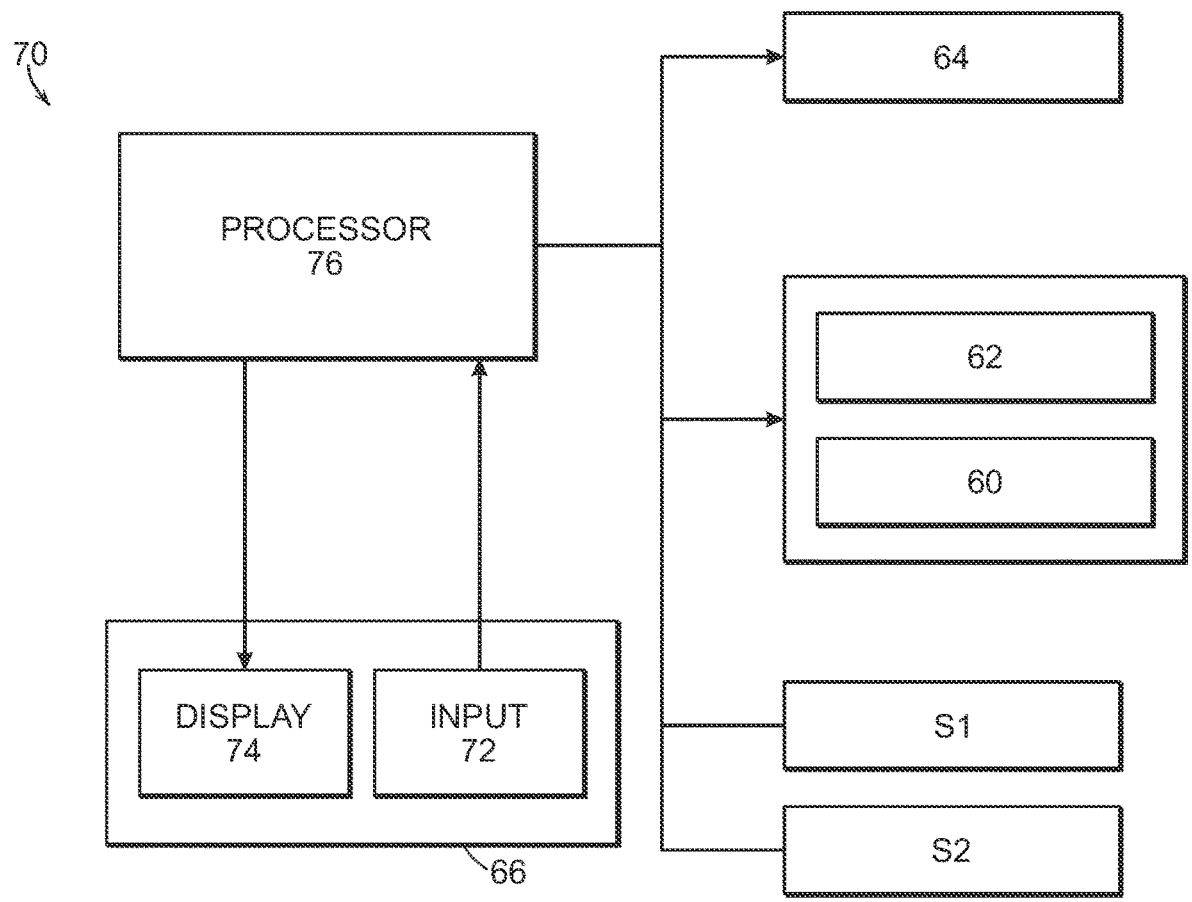
FIG. 8 is a schematic diagram of a control system of the cooking system of FIG. 1.

Since the user interface 66 is configured to receive multiple user inputs, the inputs 72 and display 74 can be communicatively coupled to the processor 76. As shown in FIG. 8, the control system 70 includes a controller or processor 76 for controlling operation of heating elements 60, 62, an air movement assembly 90 including a fan motor 64, and sensors S1, S2. These components can operate in response to a user input provided via the one or more inputs 72 and can use algorithms to execute stored sequences of heating operations. A heating output of one or more of the heating elements 60, 62 is controlled by the processor 76 and may be variable in response to the power supplied to the heating elements 60, 62. In certain aspects where the cooking system 20 includes a plurality of heating elements 60, 62, the heating elements 60, 62 may be independently operable. The sensors S1, S2 are also arranged in communication with the processor 76 and operable to monitor one or more parameters, for example a temperature within the internal heating compartments 102, 104.

Figure 3:
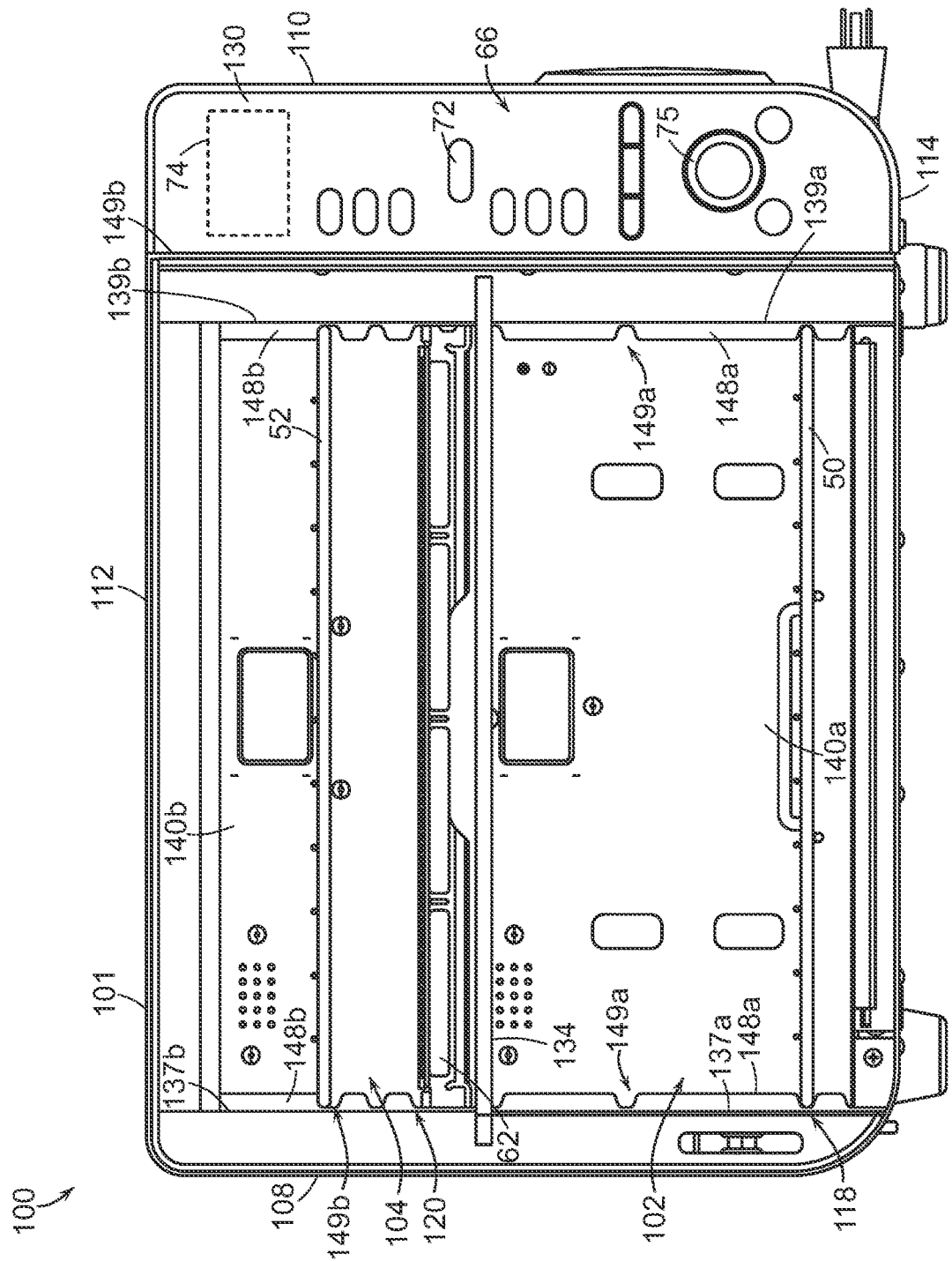
FIG. 3 is a front view of the cooking system of FIG. 1 with a door assembly removed.
Figure 4:
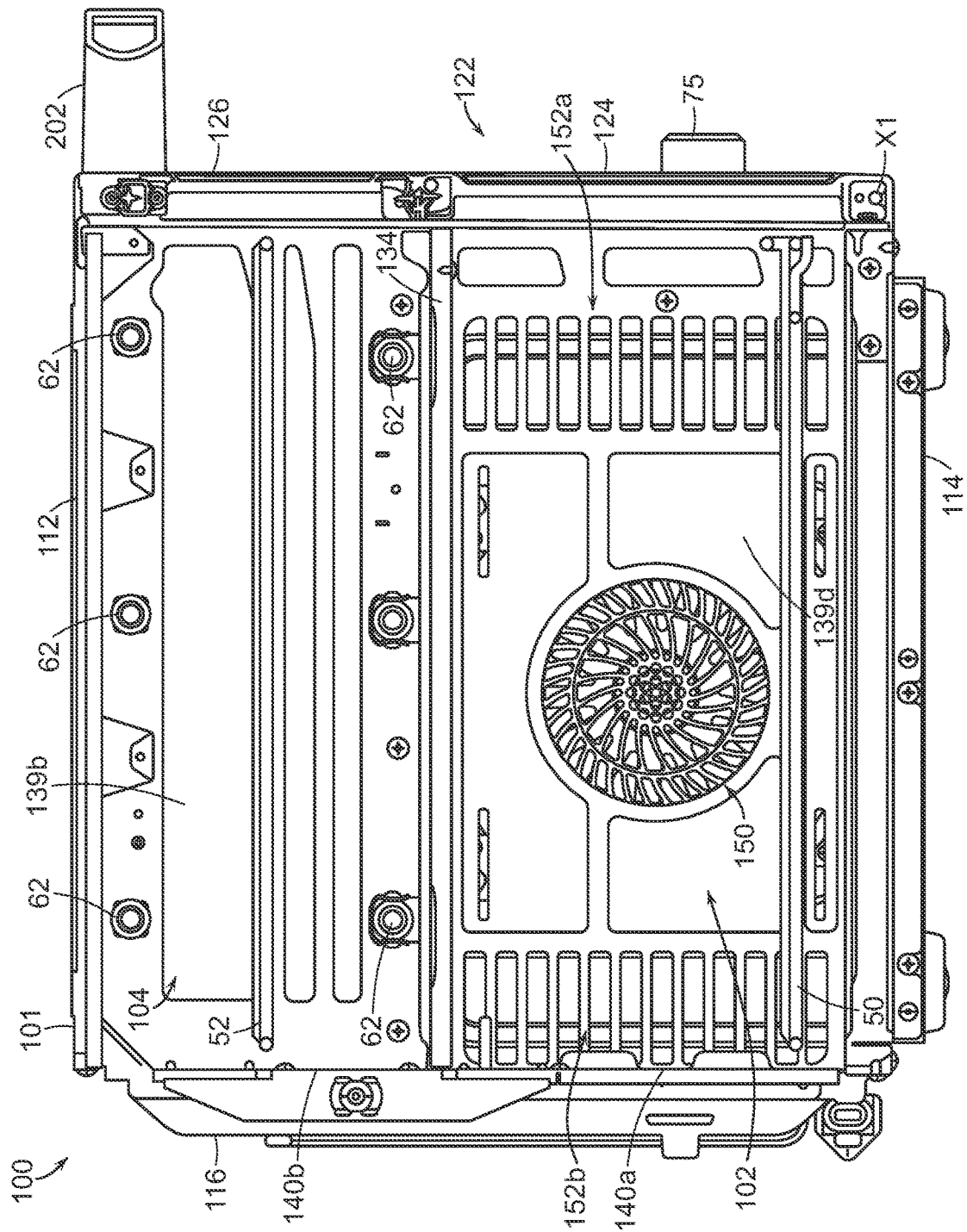
FIG. 4 is a side cross-sectional view of the cooking system of FIG. 1 taken across line 4-4.
Figure 5:
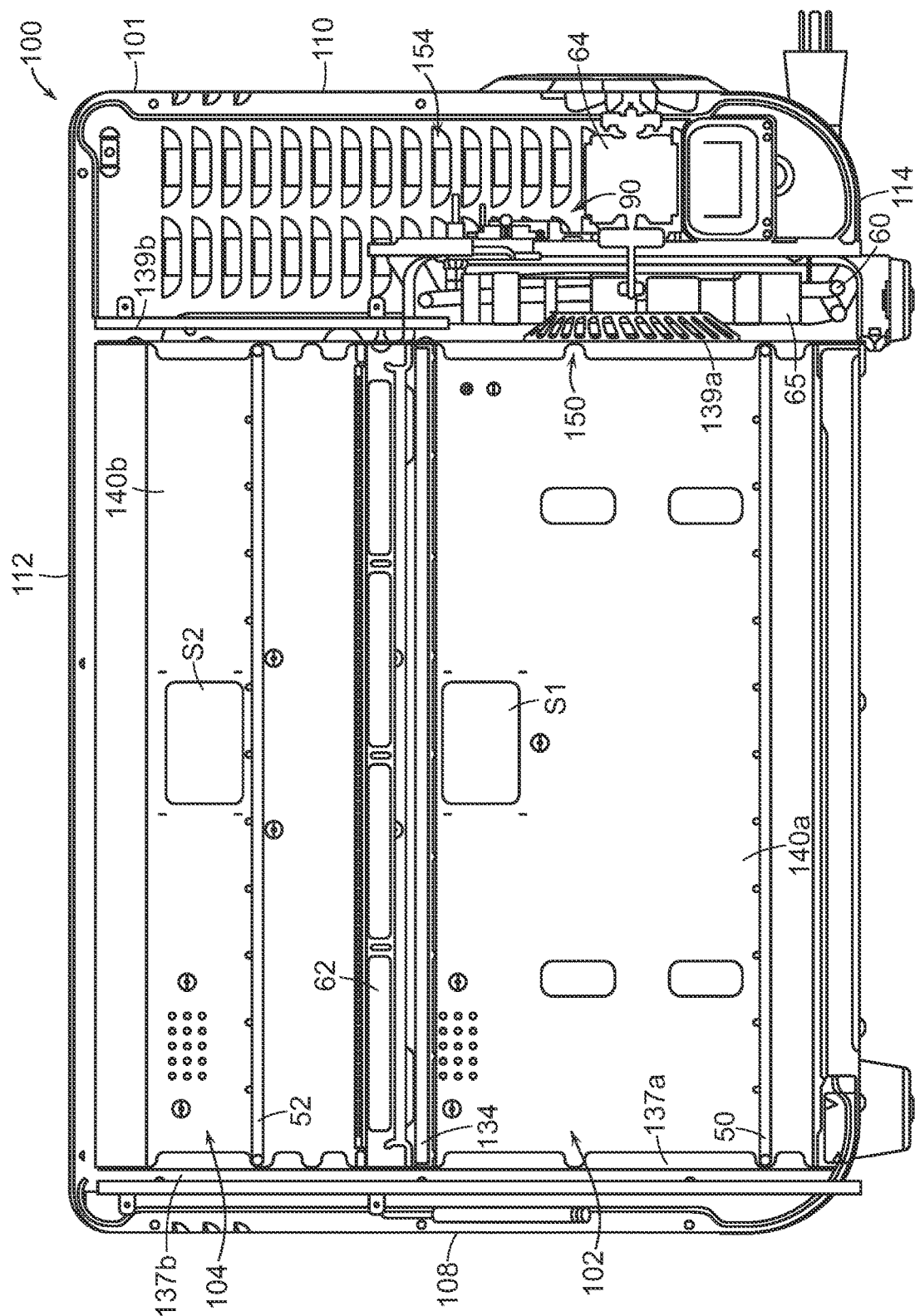
FIG. 5 is a front cross-sectional view of the cooking system of FIG. 1 taken across line 5-5.

With reference now to FIGS. 3-5, the first internal heating compartment 102 and the second internal heating compartment 104 can be separated by a divider 134. In one aspect, the divider 134 is configured to thermally isolate the first internal heating compartment 102 from the second internal heating compartment 104 so that both heating compartments 102, 104 can be active simultaneously while cooking food items at different temperatures. As described in detail below, the divider 134 can interact with the door assembly 122 in order to seal the first internal heating compartment 102 from the second internal heating compartment 104.

As illustrated in FIGS. 3-5, the first internal heating compartment 102 includes inner sidewalls 137a, 139a, and a rear inner wall 140a. The inner sidewalls 137a, 139a and the rear wall 140a are spaced apart from the exterior walls 108, 110, 116 in order to provide an insulating area between the first internal heating compartment 102 and the exterior walls 108, 110, 116. A support assembly can be arranged on the inner sidewalls 137a, 139a and can be formed from projections 148a extending inward into the first internal heating compartment 102 and extending along the length of the inner sidewalls 137a, 139a from the front to the back of the device. Formed between the projections 148a are channels 149a arranged at different height levels within the first internal heating compartment 102. The projections 148a may be integrally formed with the inner sidewalls 137a, 139a, such as by the projections 148a being stamped directly in the sheet forming the inner sidewalls 137a, 139a.

The projections 148a can be positioned to support one or more cooking accessories 50, such as a removable cooking rack (shown in FIG. 3), a basket, a spit, a drip tray, or a griddle, at a desired position within the first internal heating compartment 102. The projections 148a may support the cooking accessories 50 directly or indirectly, such as if the cooking accessory is arranged within a movable cooking container that is also receivable within the first internal heating compartment 102 of the housing 101. In one aspect, multiple cooking accessories 50 can be supported within the channels 149a at different heights. However, any type of fixture capable of supporting a cooking accessory within the first internal heating compartment 102 is contemplated herein.

In addition to the projections 148a, the first internal heating compartment 102 can include apertures 150, 152a, 152b. As illustrated in FIGS. 4-5, aperture 150 is arranged within the center of the sidewall 139a, and has a fan 65 arranged therein and connected to the fan motor 64 to produce a convective heated airflow through the first internal heating compartment 102. Apertures 152a, 152b are arranged within sidewall 139a and are on opposite sides of the aperture 150 in order to allow the return of heated air from the side compartment adjacent to the first internal heating compartment. The air movement assembly 90, as illustrated in FIG. 5, including the fan motor 64 and fan 65, is arranged in a side compartment 154, which is separated from the first internal heating compartment 102. Additionally, a heating element 60 is arranged in the side compartment 154 in order to heat the airflow being generated by the air movement assembly 90. It should be understood that any number of heating elements 60 and any configuration of the heating elements 60 are contemplated herein. In one aspect, a heating element can be arranged within the first internal heating compartment 102.

Figure 6:
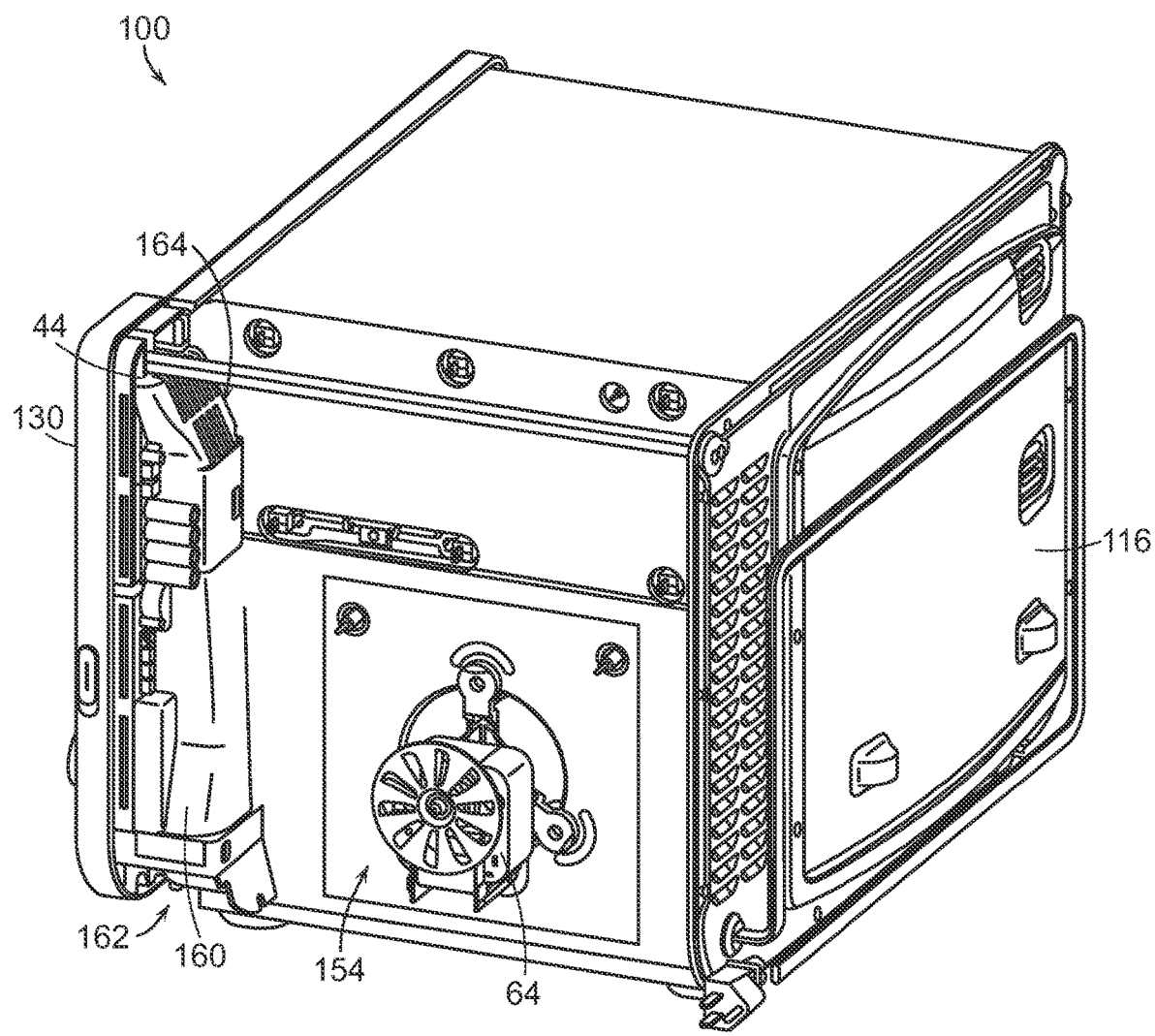
FIG. 6 is a rear perspective view of the cooking system of FIG. 1 with an outer housing removed.
Figure 7:
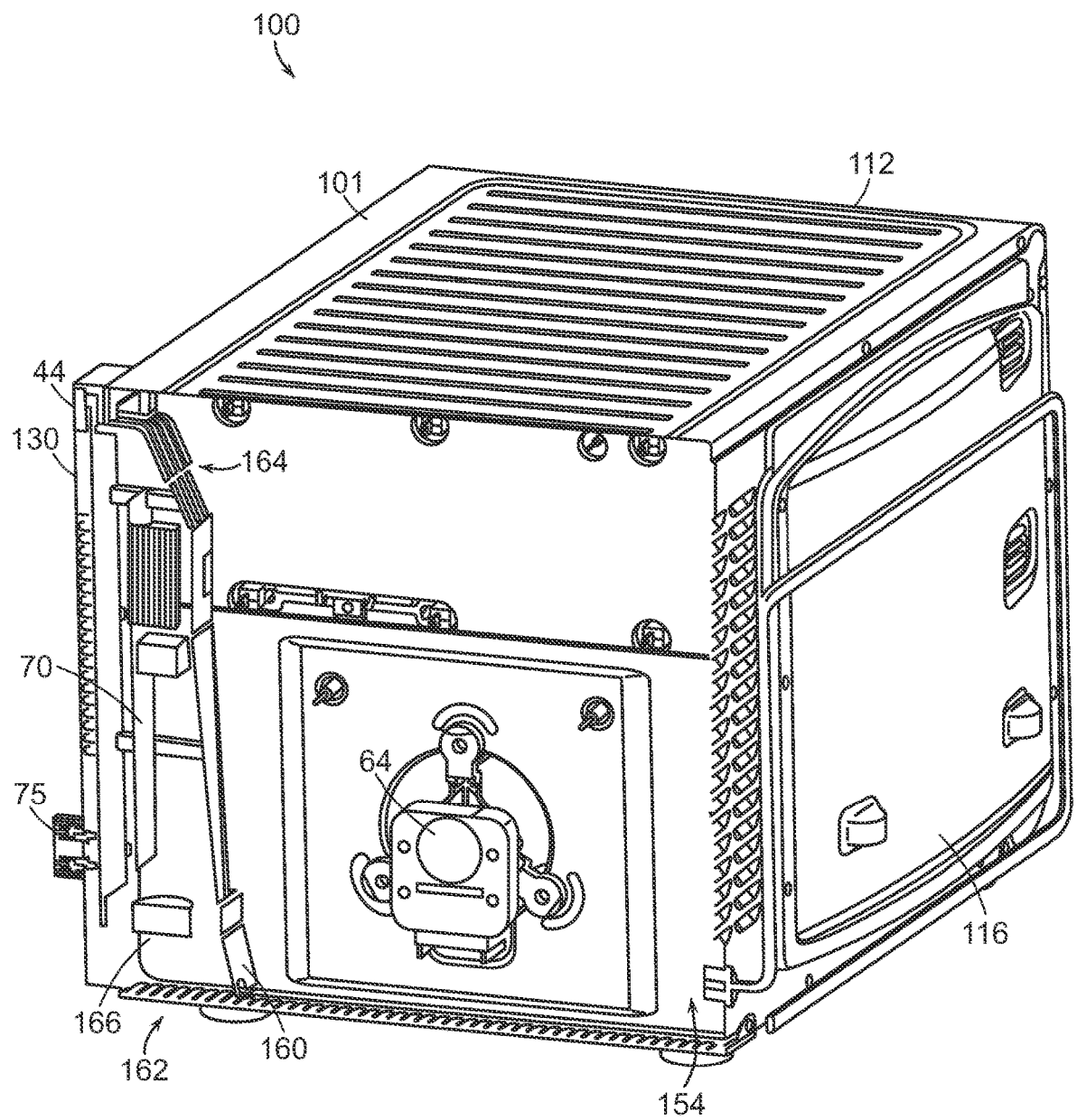
FIG. 7 is a rear perspective cross-sectional view of the cooking system of FIG. 1 taken across line 7-7.

As illustrated in FIGS. 6-7, also positioned within the side compartment 154 is housing 160. The housing 160 is connected to the back surface of panel 44 and within the housing 101 adjacent the right sidewall 110. The control system 70, specifically the processor 76 is arranged within the housing 160 in order to protect the sensitive electronics of the control system 70 from the heat generated within the housing 101. The housing 160 includes an inlet 162 for cool air to enter the housing and pass over the control system 70. An outlet 164 positioned at the top of the housing 160 discharges the air from the housing 160 into the side compartment 154. In one aspect, a fan 166 can be arranged within the housing 160 to aid in directing air through the housing 160 from the inlet 162 to the outlet 164.

Still with reference to FIGS. 3-5, while the first internal heating compartment 102 is different from the second internal heating compartment 104, both compartments can contain similar components, such that like components will not be described in detail. Similar to the first internal heating compartment 102, the second internal heating compartment 104 can include inner sidewalls 137b, 139b, and a rear inner wall 140b. A support assembly can be arranged on the inner sidewalls 137b, 139b and can be formed from projections 148b extending inward into the second internal heating compartment 104 and extending along the length of the inner sidewalls 137b, 139b. Formed between the projections 148b are channels 149b arranged at different height levels within the second internal heating compartment 104. Similar to the projections 148a, the projections 148b are positioned to support one or more cooking accessories 52, such as a removable cooking rack (shown in FIG. 3), a basket, a spit, a drip tray, or a griddle, at a desired position within the second internal heating compartment 104.

As stated above, the second internal heating compartment 104 of the housing 101 can be heated by at least one heating element. In one aspect, the cooking system 100 includes at least one heating element 62 positioned within the second internal heating compartment 104, for example adjacent the top wall 112 of the housing 101. As illustrated in FIG. 4, the cooking system 100 includes a plurality of heating elements 62, such as three heating elements, oriented generally parallel to the hinge axis X1 of the door assembly and spaced across a depth of the top wall 112 of the housing 101 within the second internal heating compartment 103. It should be understood that any number of heating elements 62 and any configuration of the heating elements 62 are contemplated herein. Alternatively, or in addition, at least one heating element 62 may be positioned within the second internal heating compartment 104, for example adjacent the divider 134. The illustrated cooking system 100 includes three heating elements 62 oriented generally parallel to the hinge axis X1 and spaced across a depth of the divider 134 of the second internal heating compartment 104. The heating elements 62 may be generally aligned or may be staggered relative to one another. It should be understood that although the heating elements 62 of the cooking system 100 are illustrated and described as being positioned generally adjacent the top wall 112 and divider 134 of the housing 101, respectively, embodiments where the cooking system 100 includes one or more heating elements (not shown) located adjacent one or more lateral sides of the first or second internal heating compartments 102, 104 and/or within a center of the internal heating compartments 102, 104 are also contemplated herein. In one aspect, the heating elements 62 can include guards positioned about the length of each of the heating elements 62 to protect the heating elements 62 from food product which may fall from a cooking accessory. The guards can include apertures and slots to ensure infrared heat is able to pass around the guards and properly heat the air within the second internal heating compartment 104 and a cooking accessory.

The one or more heating elements 60, 62 of the cooking system 100 may be selected to perform any suitable type of heating, including but not limited to, conduction, convection, radiation, and induction. Accordingly, the at least one heating element 60, 62 may be any type of heating element, such as a tubular, quartz, tungsten, or halogen heating element for example. At least one of the plurality of heating elements 60, 62 of the cooking system 100 may be a quartz infrared heating element. In one aspect, the cooking system 100 includes a plurality of heating element 62 and all of the heating elements 62 are quartz infrared heating elements. The at least one heating element 60 may also be a quartz infrared heating element, or alternatively, may be another type of heating element, such as a calrod heating element for example. In operation, a quartz infrared heating element is configured to transfer a large portion or amount of energy via radiation and a smaller portion of energy via convection. This is distinguishable from other countertop cooking systems which commonly use heating elements, such as calrod heating elements, configured to transfer heat primarily via convection and secondarily via radiation. However, in one aspect, the use of calrods can be used and should be considered within the scope of this disclosure.

It should be understood that in embodiments of the cooking system 100 having a plurality of heating elements 60, 62 arranged at multiple locations within the internal heating compartments 102, 104, the plurality of heating elements 60, 62 may be substantially identical, or alternatively, may be different, and further may be operable to perform similar or distinct types of heating. In one aspect, the heating elements are radiant heating elements. However, heating elements operable to perform other combinations of heating are contemplated herein.

As stated above, the cooking system 100 may include one or more sensors, such as first and second temperature sensors S1, S2, for monitoring conditions within the first and second internal heating compartments 102, 104. The temperature sensors S1, S2 may be configured to communicate with the processor 76 either wirelessly or via one or more wires, such as wires embedded within the housing 101, external to the first and second internal heating compartments 102, 104. As illustrated in FIG. 5, the cooking system 100 includes a first temperature sensor S1 configured to monitor a temperature of the environment or air of the first internal heating compartment 102. In addition to the one or more temperatures sensors S1 used to monitor the temperature of the first internal heating compartment 102, the cooking system 100 may further employ one or more additional temperature sensors S2 to sense and communicate to the processor 76 the temperature of the environment or air within the second internal heating compartment 104. As illustrated in FIG. 5, the temperature sensors S1, S2 are arranged in the rear sidewalls 140a, 140b of the first and second internal heating compartments 102, 104, respectively. The temperature sensors S1, S2 can be configured to monitor the temperatures of the environments of the first and second internal heating compartments 102, 104 and may be located at any suitable position within the internal heating compartments 102, 104, such as near a sidewall thereof, or near one or more of the heating elements 60, 62. In one aspect, the temperature sensors S1, S2 are arranged within a protective cage, which protects the sensors S1, S2 from contact with food particles within the internal heating compartments 102, 104 during a cooking operation. The temperature sensors S1, S2 of the cooking system 100 can each be a negative temperature coefficient (NTC) temperature sensor. However, other types of temperature sensors are also contemplated herein.

As stated above, the cooking system 100 as illustrated and described herein provides enhanced temperature regulation. By including two separate heating elements 60, 62 in two separate thermally isolated heating compartments 102, 104, the temperatures of the first and second internal heating compartments 102, 104 can be controlled independently, allowing for heat to be delivered only to the portion or areas where needed.

In one aspect, the cooking system 100 is configured to allocate portions of full power during a cooking process to the appropriate set of heating elements 60, 62, should only one heating element 60, 62 need to be active. For example, if only the first internal heating compartment 102 is activated, the control algorithm can divert full power to heating element 60 in order to bring the first internal heating compartment 102 up to the desired temperature as quickly as possible. As the cooking process continues, or if the second internal heating compartment 104 is activated, the processor 76 can be configured to redirect and split power between the heating elements 60, 62 when both internal heating compartments are activated. With the first internal heating compartment 102 at the desired temperature for cooking, full power can be intermittently provided to the second internal heating compartment in order to bring the second internal heating compartment 104 to the desired cooking temperature. Since the first internal heating compartment 102 is at the proper temperature, full power is not needed to keep the first internal heating compartment at the desired temperature due to the insulated nature of the housing 101. This "power sharing" ensures the temperature of the internal heating compartments 102, 104 are able to respond robustly to any impulses during the cooking process, such as food loads being added or the door assembly 122 being opened while at least one of the heating elements 60, 62 is active. An example of a split power sharing arrangement would be if a user were performing baking in the first internal heating compartment 102, and broiling in the second internal heating compartment 104. In this scenario, the power split would be 70% full power directed to heating element 62, and 30% full power directed to the heating element 60. However, any ratio of power splitting from 0% to 100% can be achieved with the system through the use of firmware programmed into the cooking system 100, and should be considered within the scope of this disclosure.

In order to increase the thermal efficiency of the first and second internal heating compartments 102, 104, the door assembly 122 can be arranged to seal the internal heating compartments 102, 104. As stated above, the door assembly 122 is configured to cover the openings 118, 120 for the internal heating compartments 102, 104. The illustrated door assembly 122 generally includes the first door 124, the second door 126, and frame members 170, 171 extending between the first and second doors 124, 126. In one aspect, the door assembly 122 can have multiple positions due to the combination of multiple doors. For example, the door assembly 122 can be in a fully closed position (shown in FIG. 1), where the door assembly 122 seals both the first and second internal heating compartments 102, 104. The door assembly 122 can also include a fully open position (shown in FIG. 9), where both the first and second internal heating compartments 102, 104 are open and accessible. Additionally, the door assembly 122 can include a second open position (shown in FIG. 10), where the second door 126 is pivoted relative to the first door 124 in order to seal the first internal heating compartment 102 while also allowing access to the second internal heating compartment 104.

Figure 9:
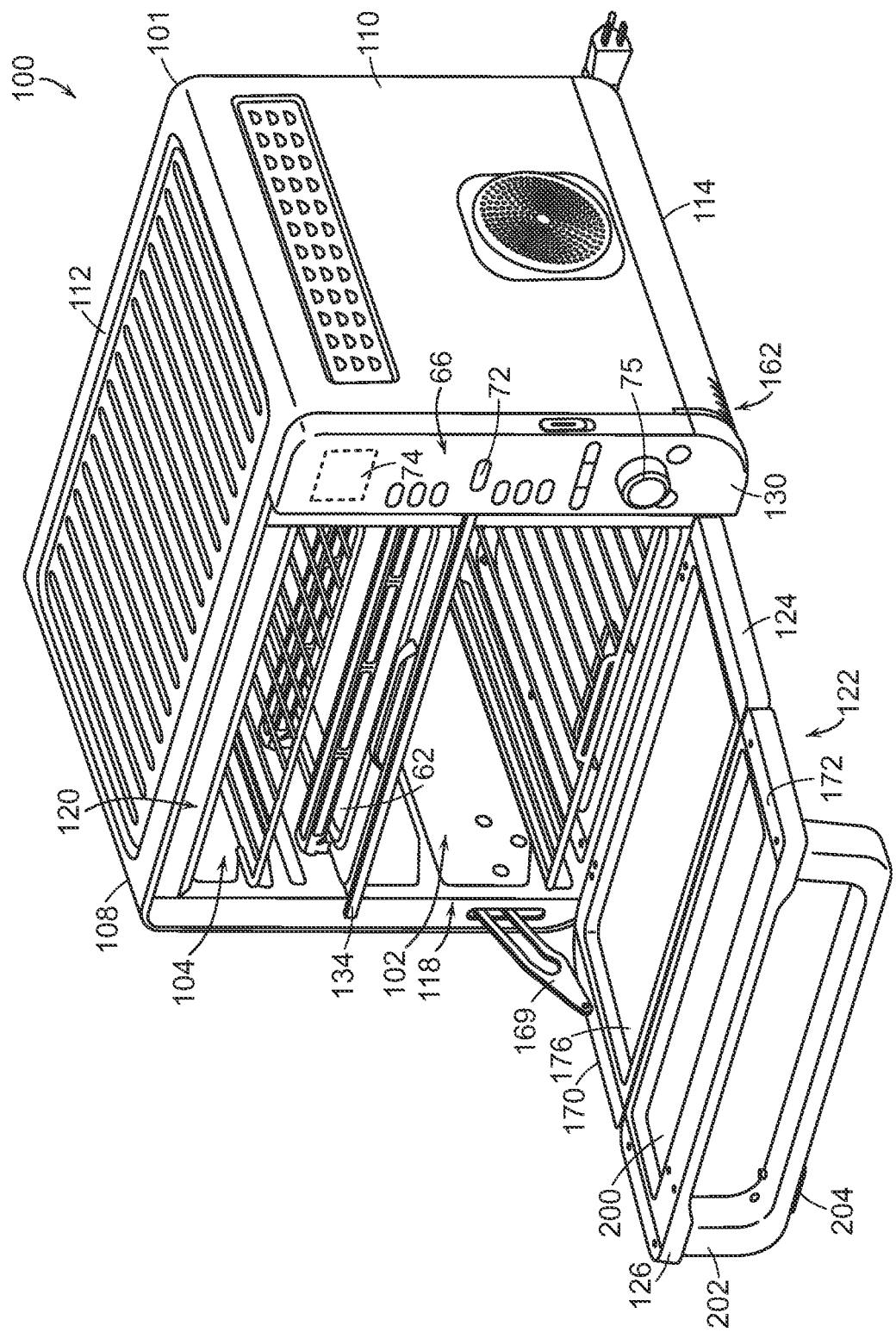
FIG. 9 is a front perspective view of the cooking system of FIG. 1 with the door assembly in a first open position.
Figure 10:
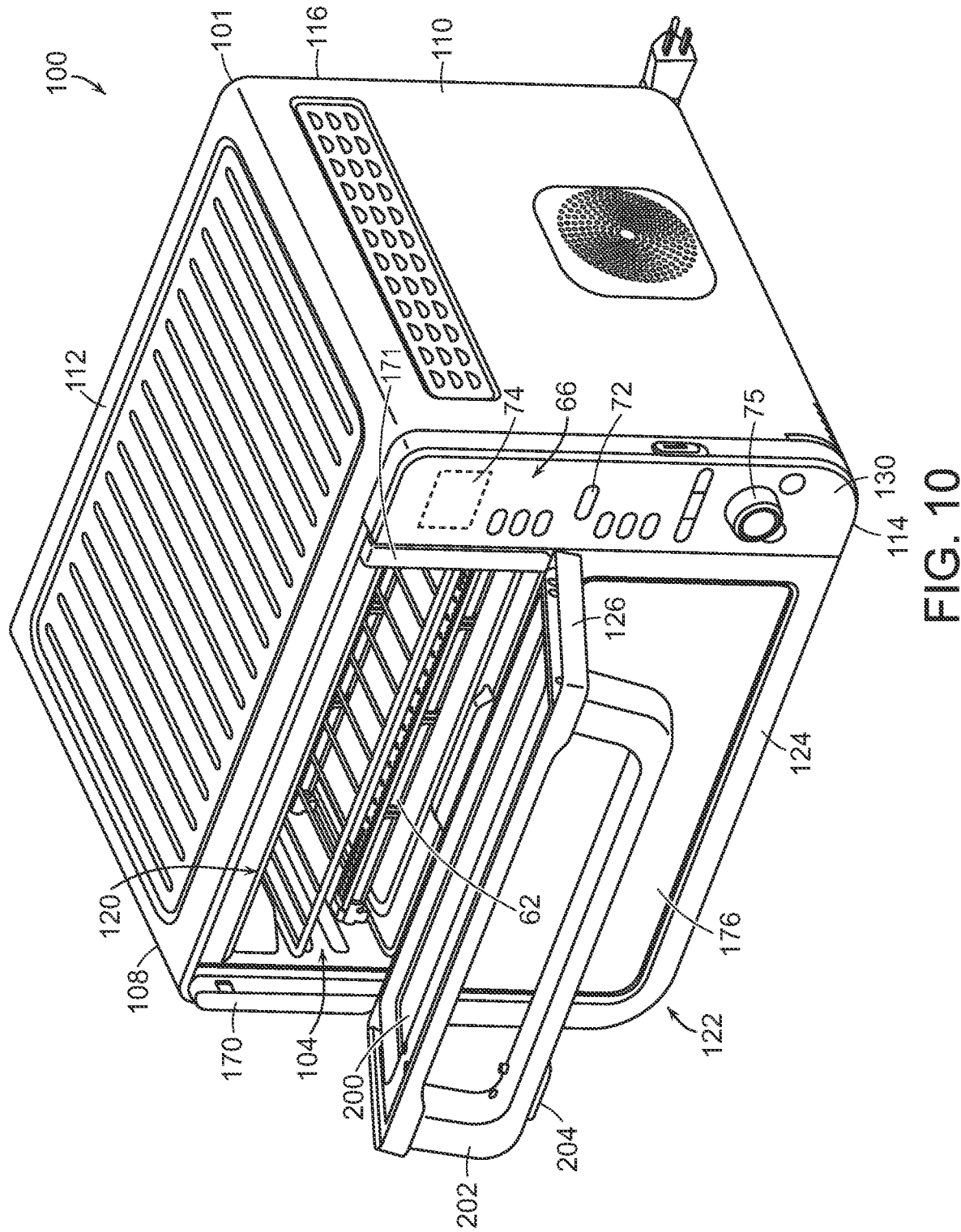
FIG. 10 is a front perspective view of the cooking system of FIG. 1 with the door assembly in a second open position.
Figure 11:
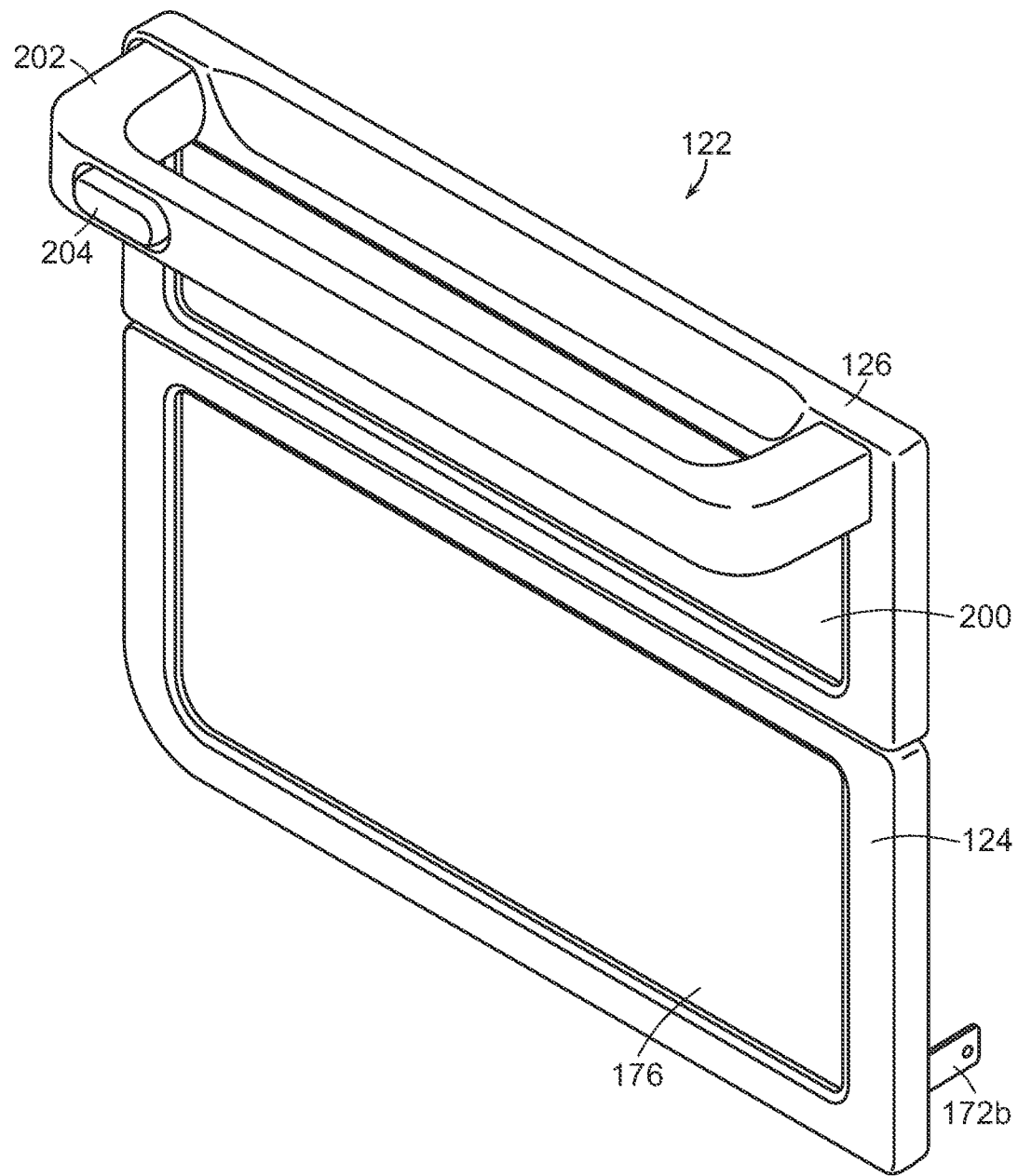
FIG. 11 is front perspective view of the door assembly of the cooking system of FIG. 1.
Figure 12:
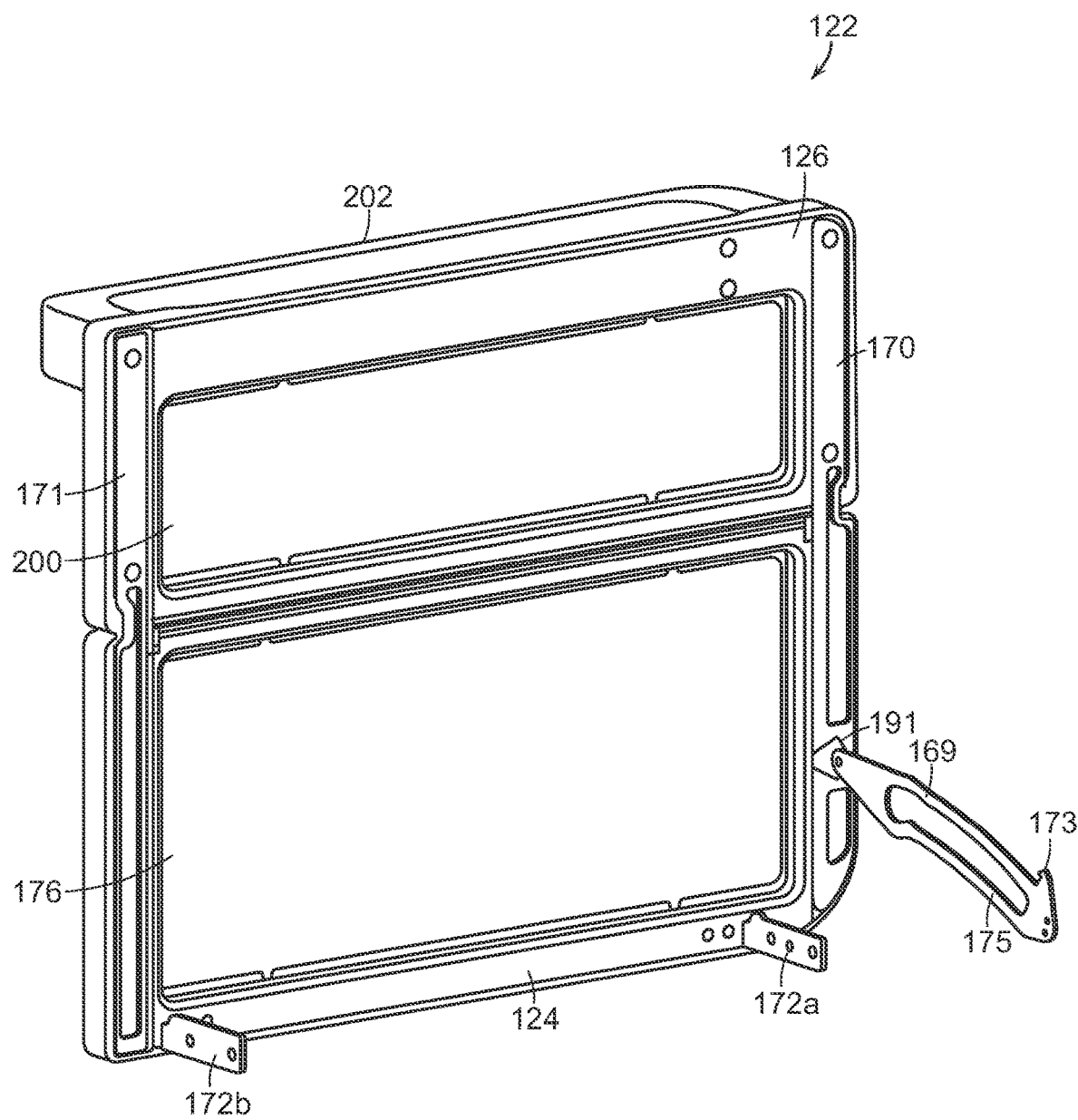
FIG. 12 is rear perspective view of the door assembly of FIG. 11.
Figure 13:
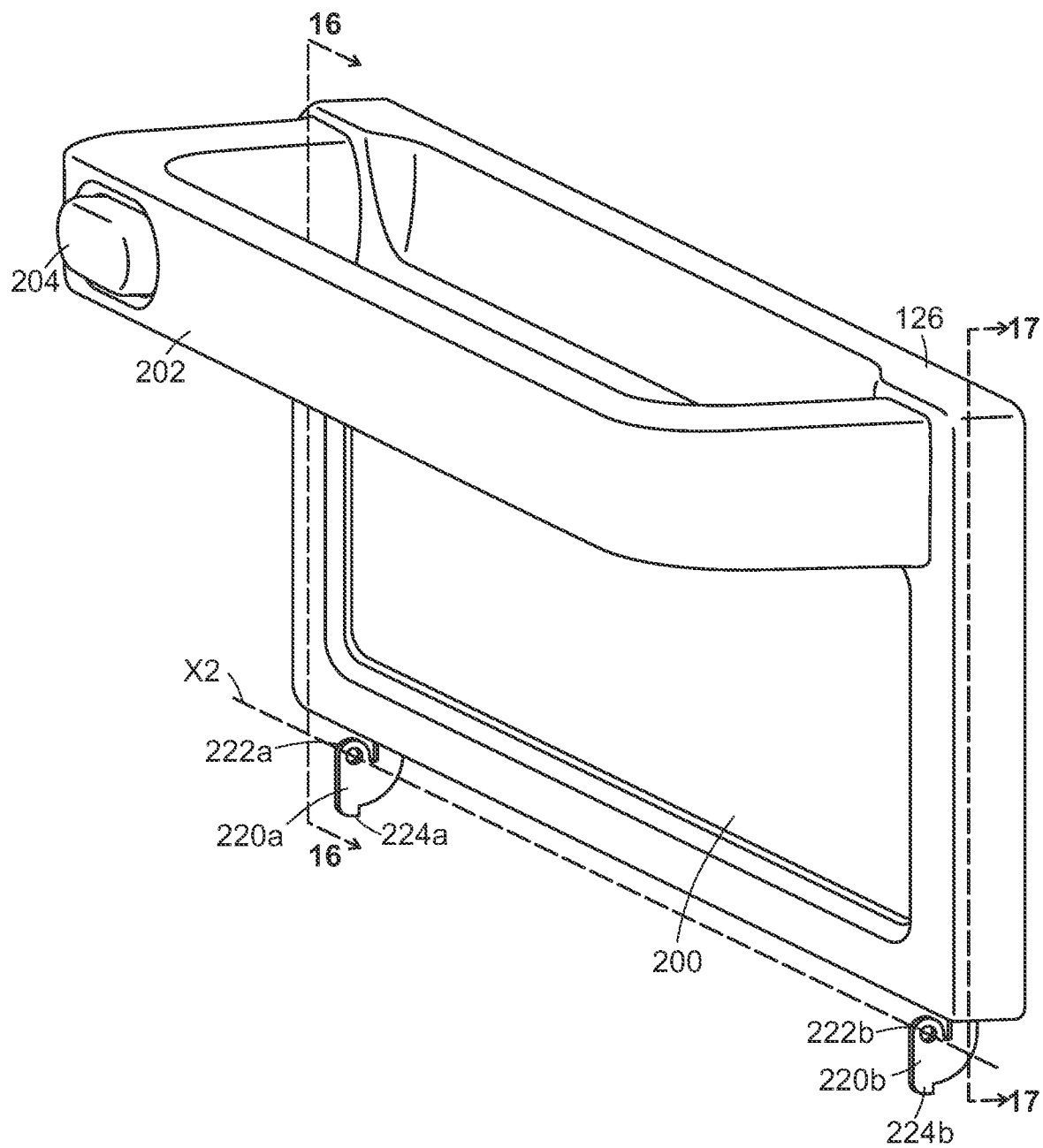
FIG. 13 is front perspective view of a second door of the door assembly of FIG. 11.

The door assembly 122 can include bracket 169, which is arranged between the housing 101 and the door assembly 122, in order to bias the door assembly 122 to either the fully open or the fully closed position. The illustrated bracket 169 is pivotally secured to a portion of the door assembly 122 and extends into a slot positioned within the housing 101, as shown in FIG. 9. In one aspect, the bracket 169 includes a tab 173 configured to interact with a biasing member, such as a spring, positioned within the housing 101, and a slot 175 configured to slide on a projection within the housing 101 to prevent the door assembly 122 from over rotating when in the opened position.

Figure 18:
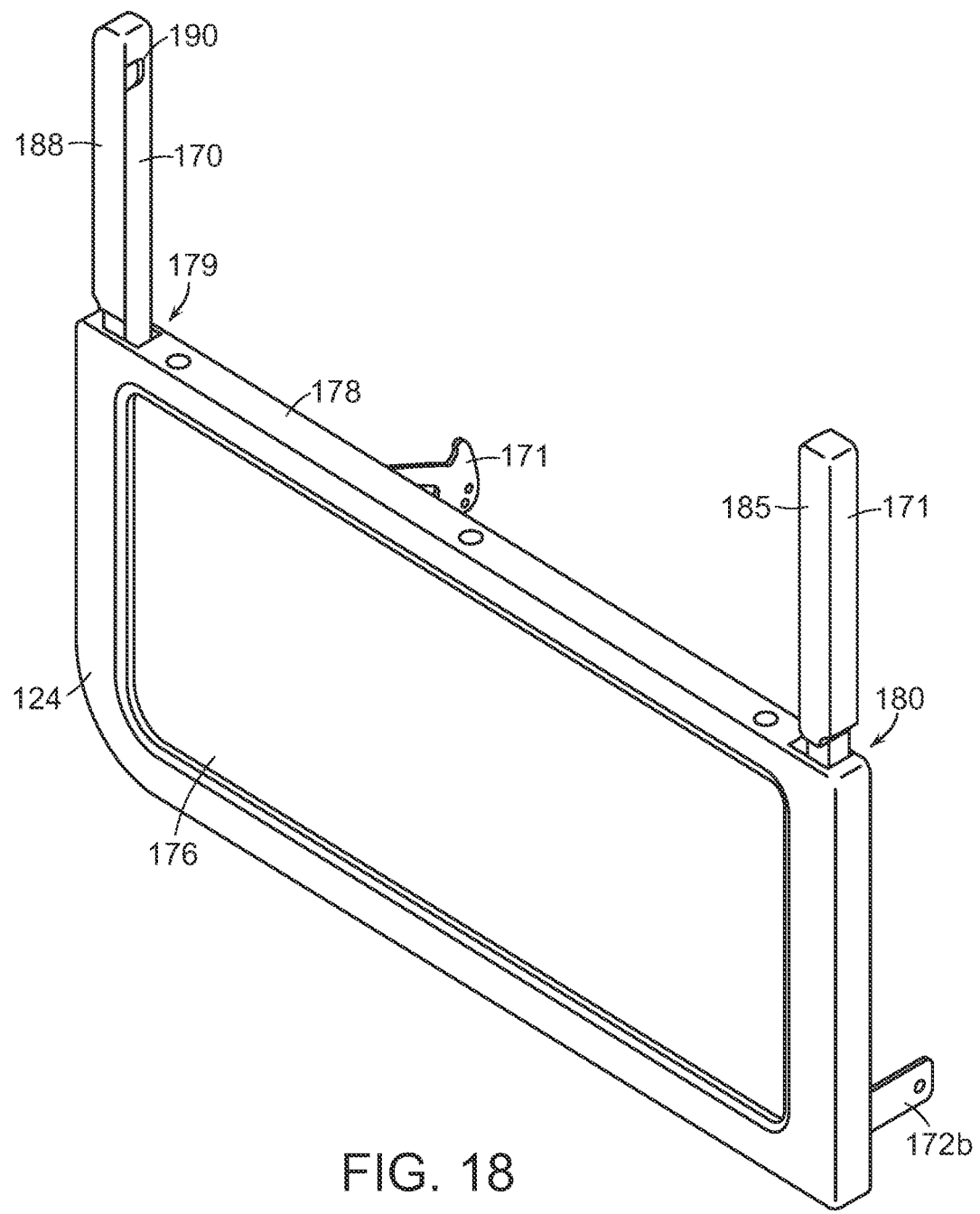
FIG. 18 is front perspective view of a first door and frame members of the door assembly of FIG. 11.
Figure 19:
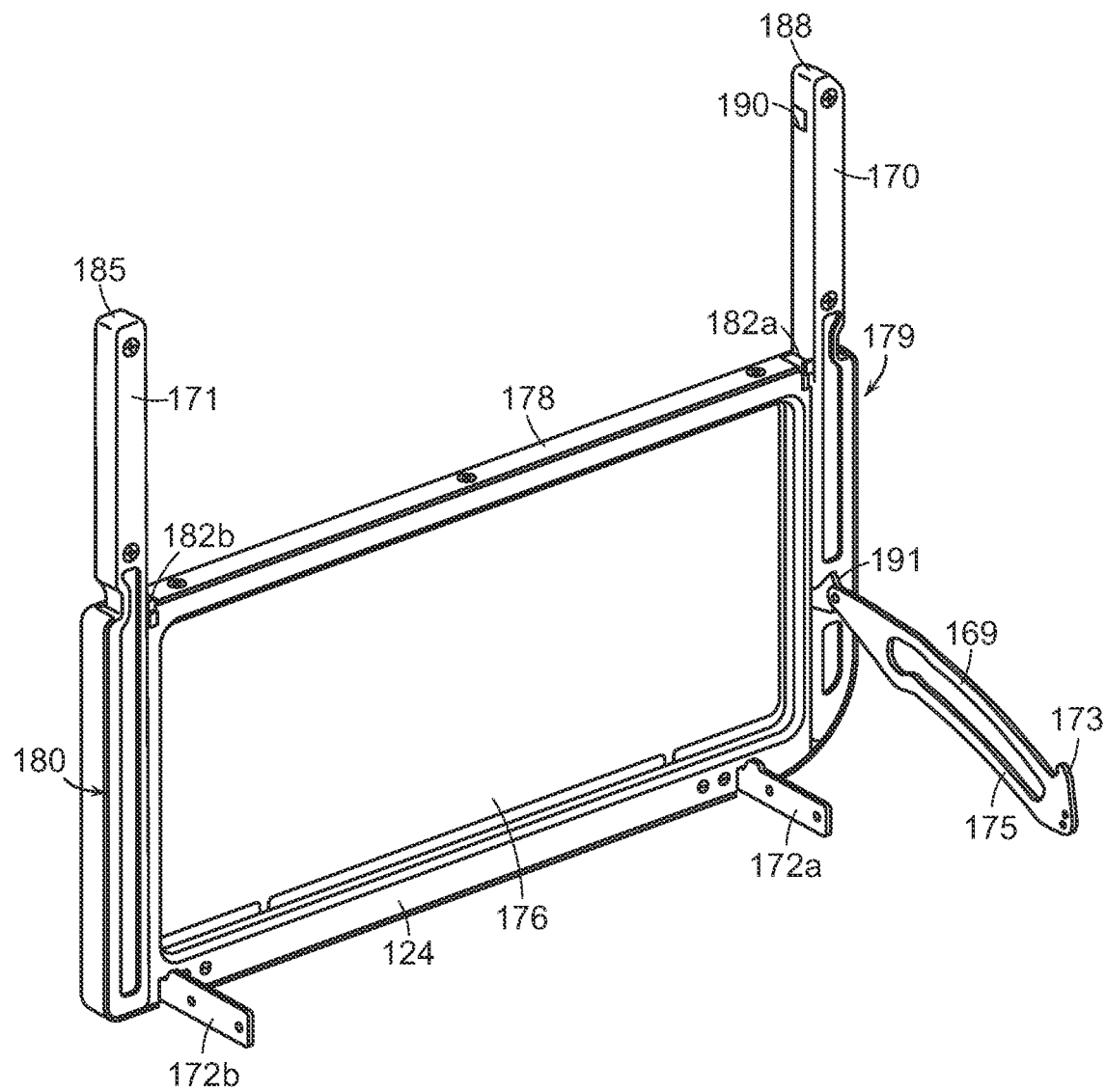
FIG. 19 is rear perspective view of the first door and the frame members of FIG. 18.

As illustrated in FIGS. 9-11 and 18-21, the first door 124 of the door assembly 122 is hinged to the housing 101 along a bottom edge between the closed position (shown in FIG. 1) and the open position (shown in FIG. 9). The first door 124 include brackets 172a, 172b pivotally connected to the bottom edge of the first door 124. Each of the brackets 172a, 172b are flat members which extend outward from the first door 124 and into the housing 101. The first door 124 can include a transparent plate 176 (e.g., glass) arranged within a frame of the first door 124 such that a user can see into the first internal heating compartment 102 during operation of the cooking system 100. Arranged on either side of the transparent plate 176 are channels 179, 180, which extend from a bottom edge to a top edge surface 178 of the first door 124. The channels 179, 180 are arranged to allow for frame members 170, 171 to be arranged therein, as described in more detail below. As shown in FIG. 18, the frame members 170, 171 extend upward above the top edge surface 178 of the first door 124. In order to secure the frame members 170, 171 to the first door 124, the first door 124 can include screws 184 which extend into the channels 179, 180 where the frame members 170, 171 are arranged.

Figure 20:
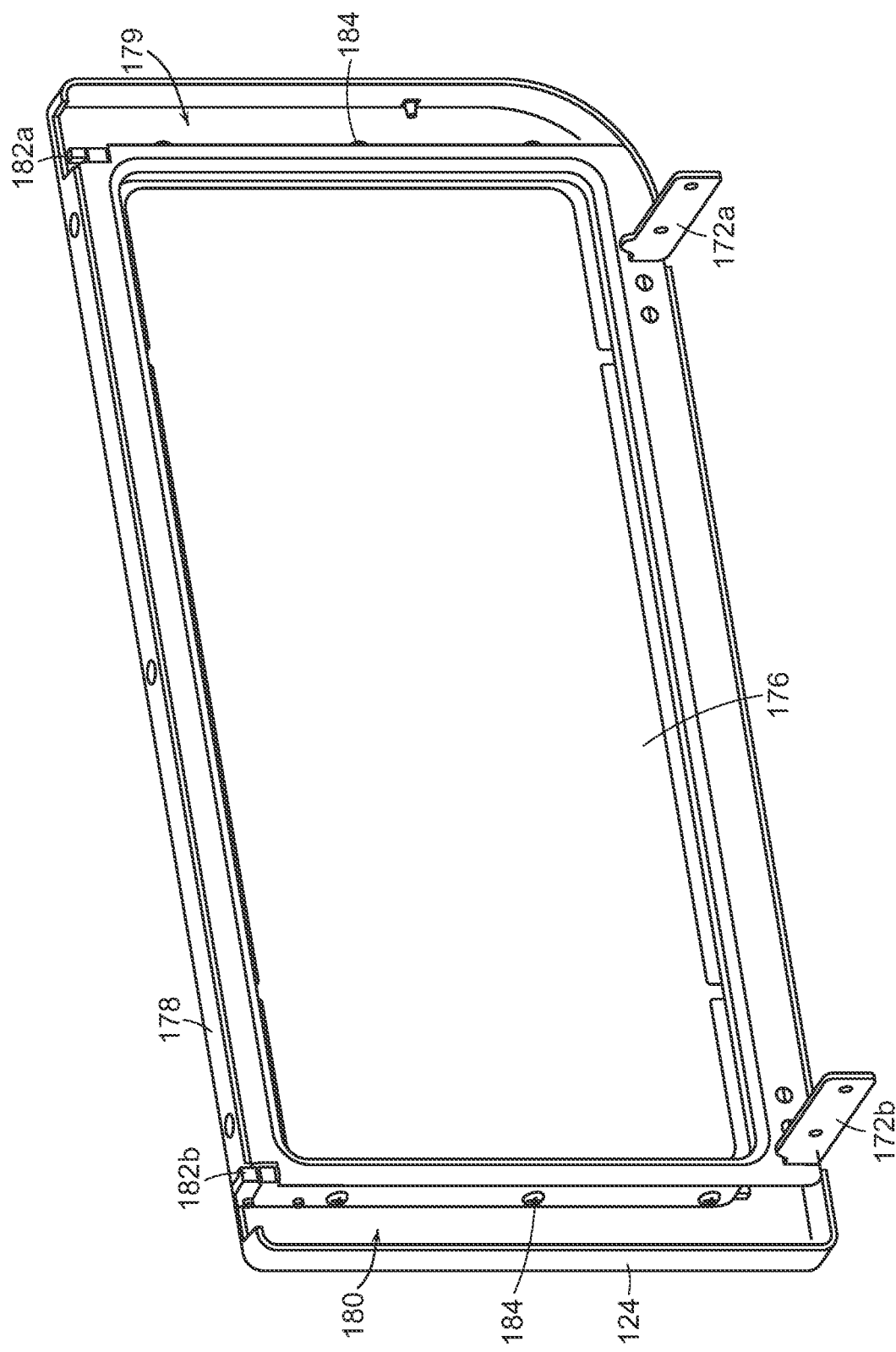
FIG. 20 is rear perspective view of the first door of the door assembly of FIG. 11.
Figure 21:
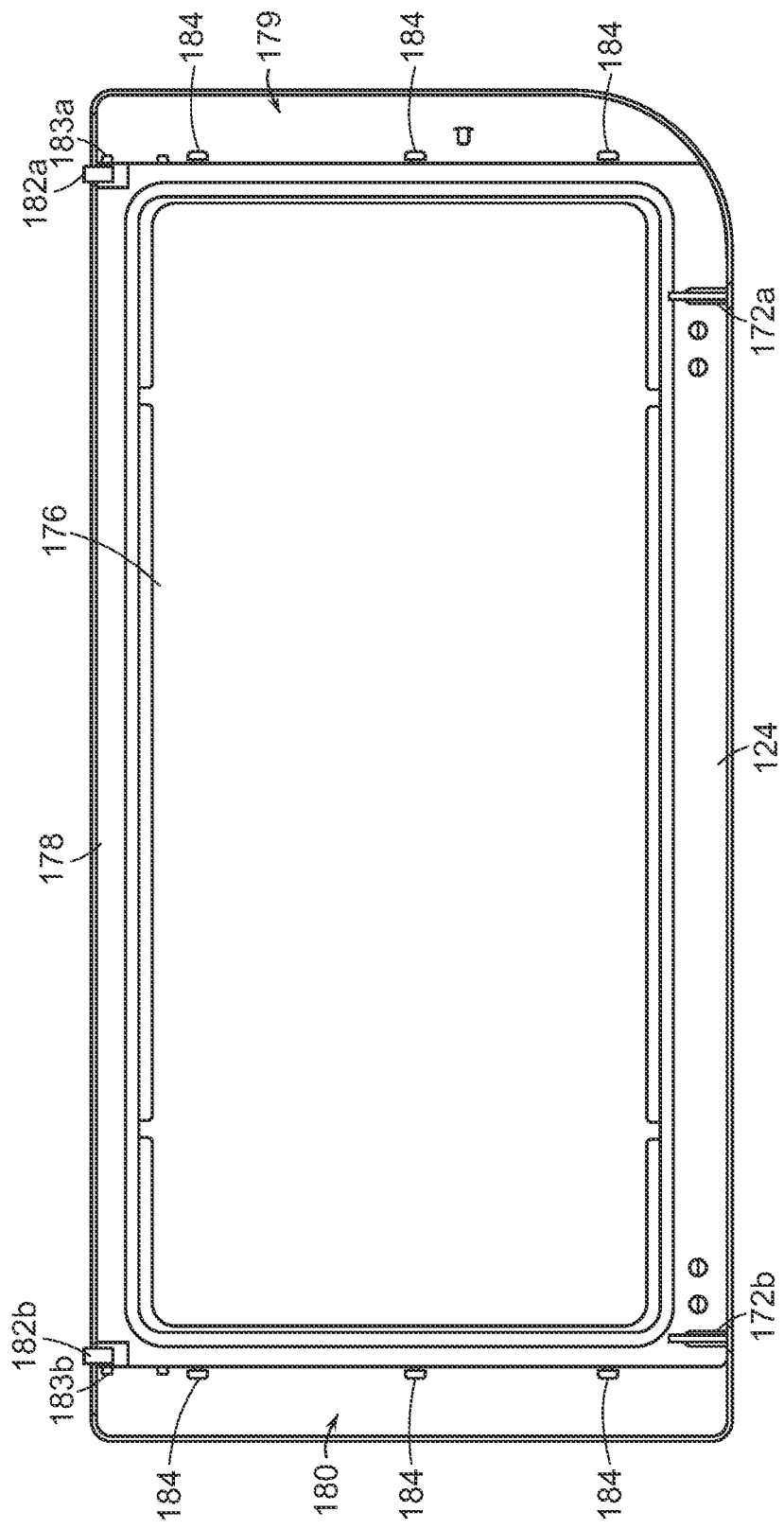
FIG. 21 is rear view of the first door of the door assembly of FIG. 11.

Also arranged on the first door 124 are tabs 182*a*, 182*b* positioned adjacent to the top edge surface 178. As illustrated in FIG. 20, the tabs 182*a*, 182*b* are arranged on opposite sides of the first door 124 and are configured to interact with the second door 126, as described in greater detail below. In one aspect, the tabs 182*a*, 182*b* are bent right-angle portions of the first door 124 proximate to the top edge surface 178. Arranged adjacent to the tabs 182*a*, 182*b* are pivot posts 183*a*, 183*b*, as illustrated in FIG. 21. In one aspect, the second door 126 is pivotally connected to the first door 124 via the pivot posts 183*a*, 183*b*, as described in greater detail below. Further, although the first door 124 is described as being pivotable about a hinge axis X1, it should be understood that embodiments where the first door 124 is configured to translate relative to the housing 101, or where the first door 124 is removably coupled to the housing 101, are also contemplated herein.

As discussed above, the frame members 170, 171 are arranged within the channels 179, 180 of the first door and are configured to aid in the interaction between the first door 124 and the second door 126. In one aspect, the frame members 170, 171 do not lock to or positively engage with the housing 101. Instead, the frame members 170, 171 only abut against the front surface of the housing 101 along surfaces 170*c*, 171*c* in order to seal the first and second internal heating compartments 102, 104. In another aspect, the frame members 170, 171 can positively lock to the housing 101 in order to prevent accidental opening of the door assembly 122.

Figure 22:
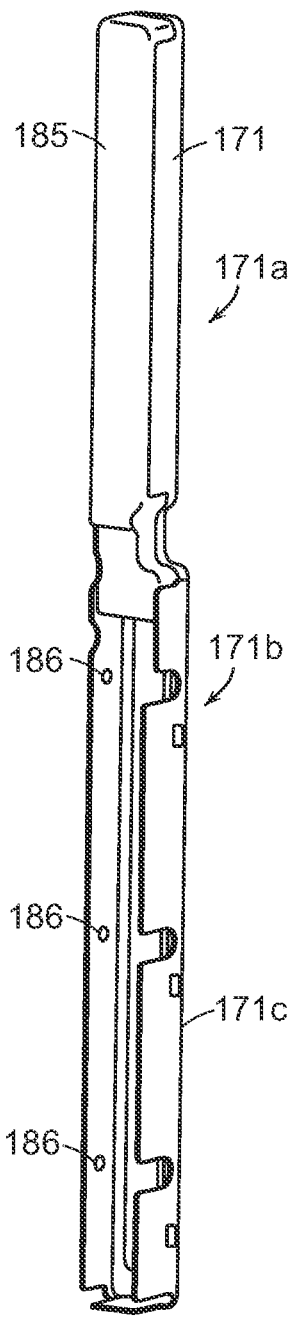
FIG. 22 is a front perspective view of a first frame member of the door assembly of FIG. 11.
Figure 23:
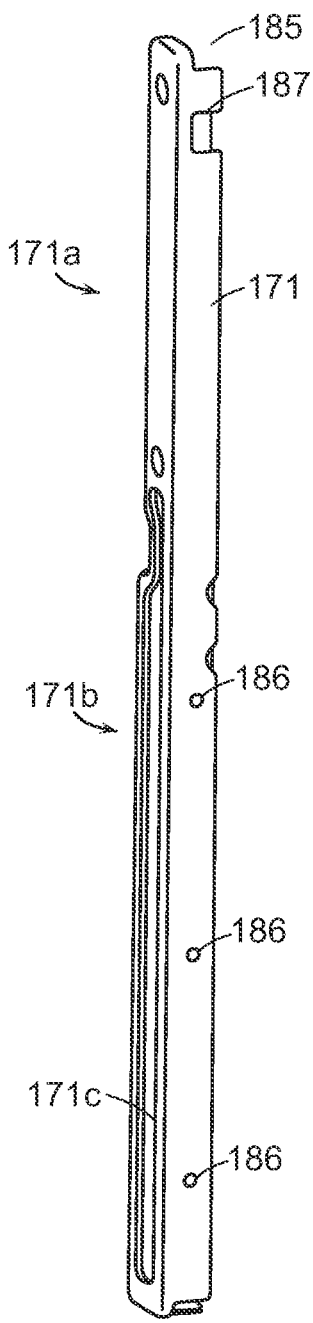
FIG. 23 is a rear perspective view of the first frame member of FIG. 22.

Frame member 171 is illustrated in isolation in FIGS. 22-23. The illustrated frame member 171 is a stamped or extruded metal component having a U-shaped cross-section. An upper portion 171*a* is configured to be arranged in a channel of the second door 126, and the lower portion is configured to be arranged within the channel 180 of the first door 124. A face plate 185 is arranged in the upper portion 171*a* and fills in the gap within the cross-section of the frame member 171, since the upper portion 171*a* is exposed to a user when the second door 126 is in an open position. The upper portion 171*a* also includes a locking aperture 187, which is configured to interact with a locking projection of the second door 126, which is described in greater detail below. The lower portion 171*b* includes apertures 186, which are configured to allow screws 184 to pass therethrough, securing the frame member 171 within the channel 180 of the first door 124.

Figure 24:
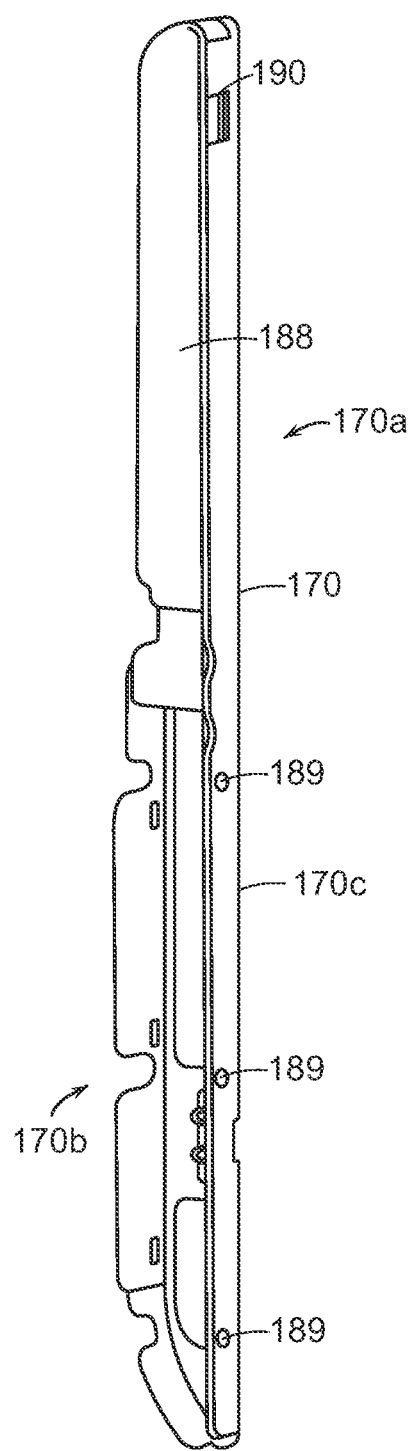
FIG. 24 is a front perspective view of a second frame member of the door assembly of FIG. 11.
Figure 25:
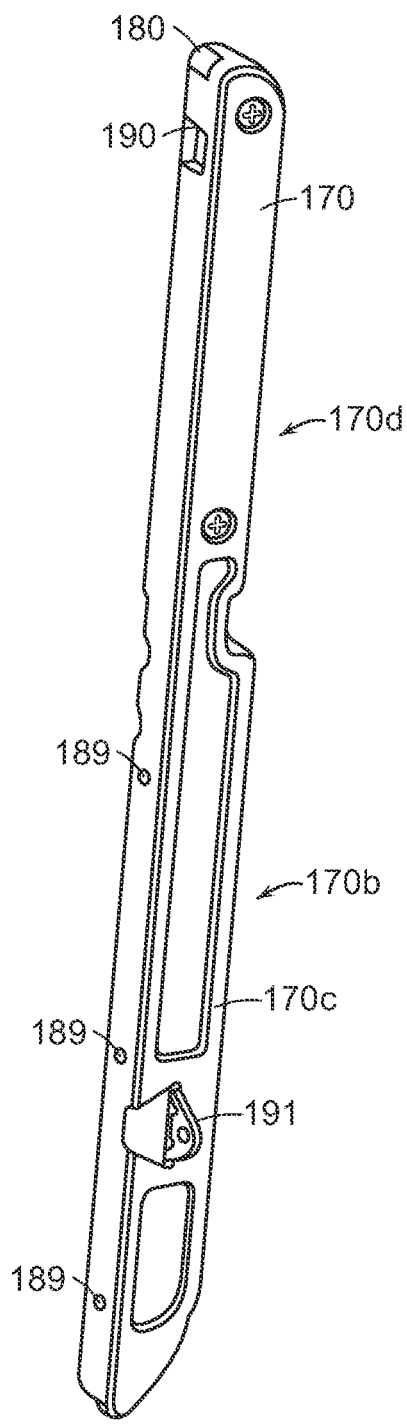
FIG. 25 is a rear perspective view of the second frame member of FIG. 24.
Figure 26:
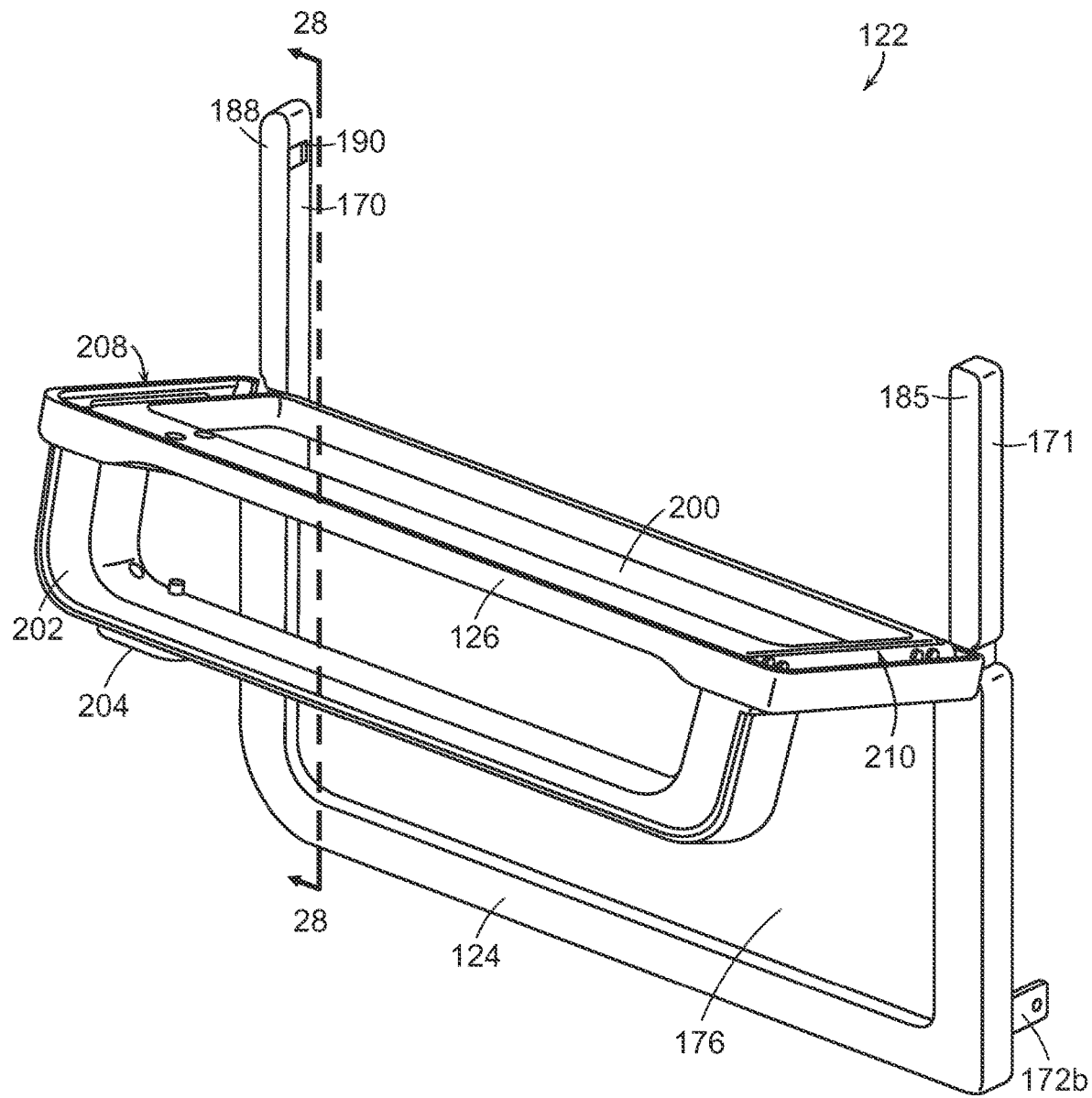
FIG. 26 is a front perspective view of the door assembly of FIG. 11 with the second door in an open position.
Figure 27:
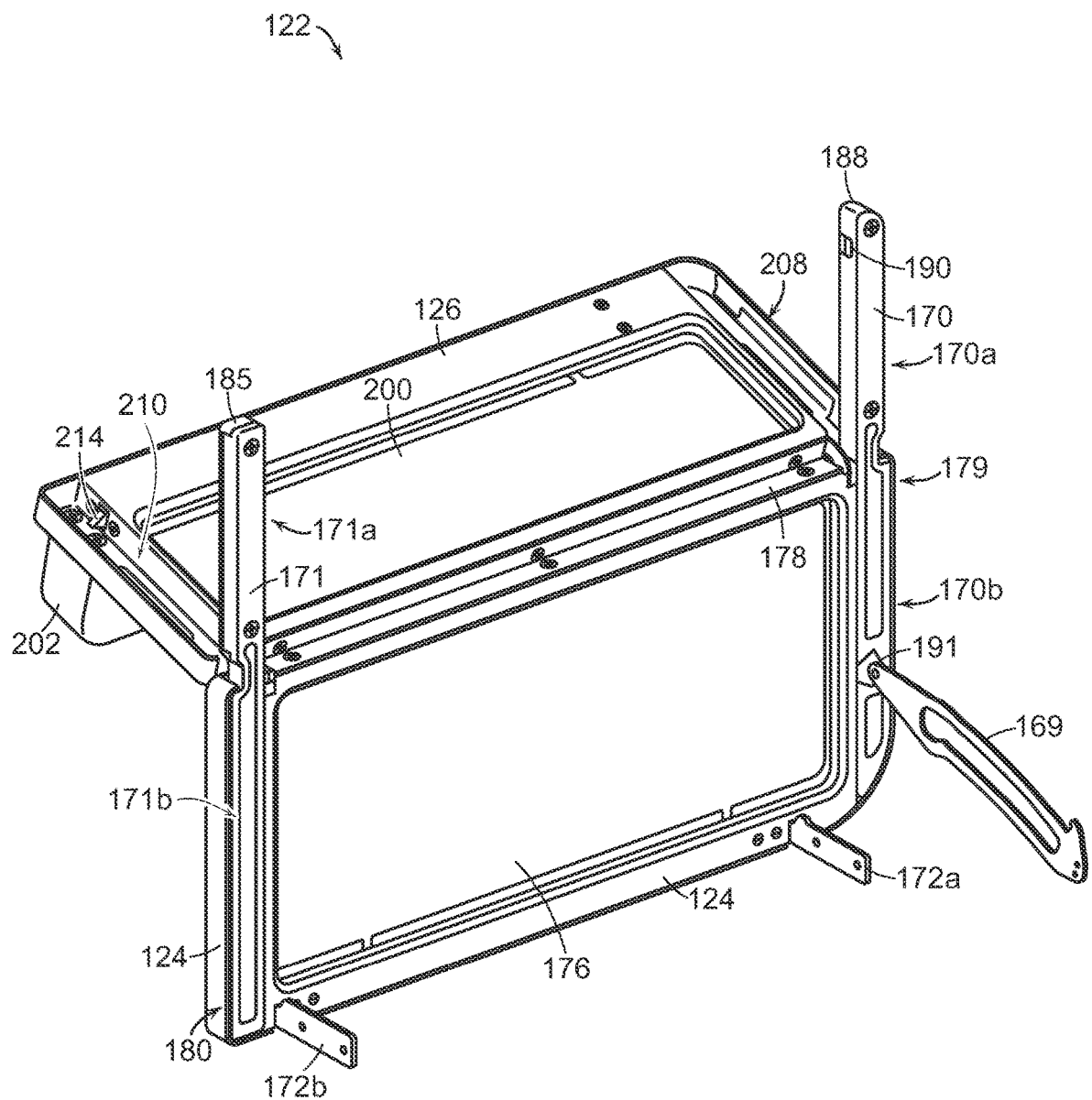
FIG. 27 is a rear perspective view of the door assembly of FIG. 26.

Similar to frame member 171, frame member 170 is illustrated in isolation in FIGS. 24-25. An upper portion 170*a* is configured to be arranged in a channel of the second door 126, and the lower portion is configured to be arranged within the channel 179 of the first door 124. A face plate 188 is arranged in the upper portion 170*a* and fills in the gap within the cross-section of the frame member 170, since the upper portion 170*a* is exposed to a user when the second door 126 is in an open position. The upper portion 170*a* also includes a locking aperture 190, which is configured to interact with a locking projection of the second door 126, which is described in greater detail below. The lower portion 170*b* includes apertures 189, which are configured to allow screws 184 to pass therethrough, securing the frame member 170 within the channel 179 of the first door 124. Additionally, the frame member 170 includes a bracket 191 which allows the bracket 169 to pivotally secure to the door assembly 122.

As indicated above, the door assembly 122 also includes the second door 126 configured to seal the second internal heating compartment 104. As illustrated in FIGS. 13-17, similar to the first door 124, the second door 126 includes a transparent plate 200 arranged within the second door 126 so that a user can see within the second internal heating compartment 104 during operation. The second door 126 is configured to pivotally connect to the first door 124 at pivot posts 183*a*, 183*b*, and pivots along hinge axis X2. Further, although the second door 126 is described as being pivotable about a hinge axis X2, it should be understood that embodiments where the second door 126 is configured to translate relative to the housing 101, or where the second door 126 is removably coupled to the housing 101 are also contemplated herein.

Figure 28:
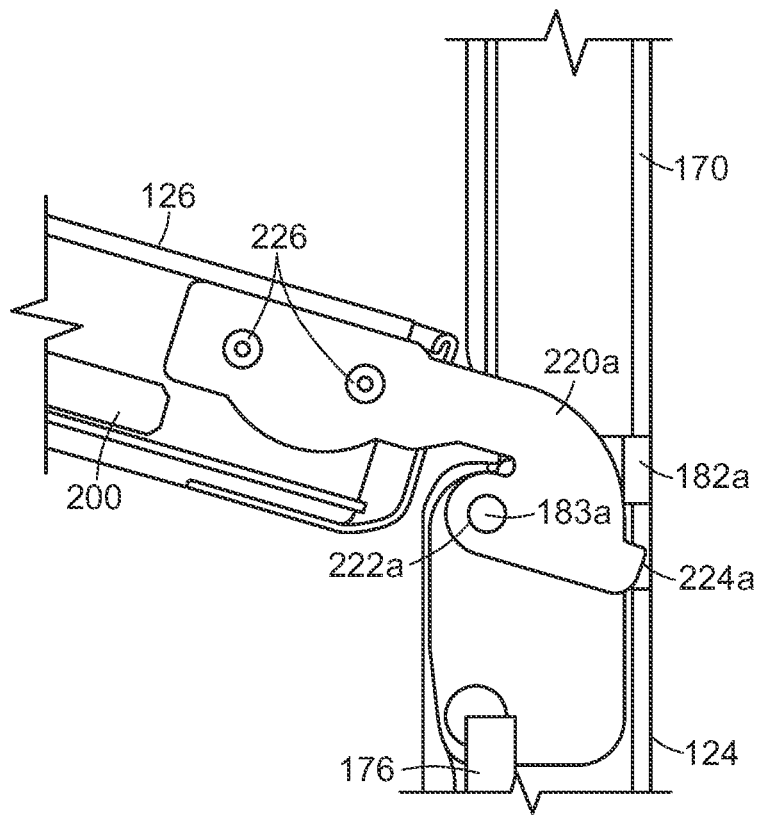
FIG. 28 is a detailed cross-sectional view of the door assembly of FIG. 26.
Figure 29:
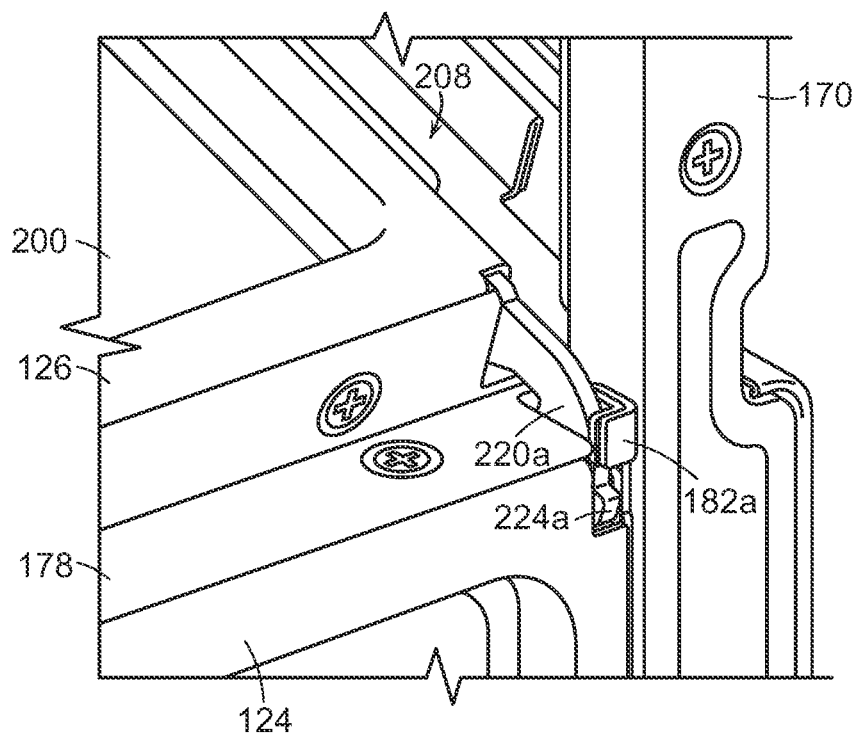
FIG. 29 is a detailed rear perspective view of the door assembly of FIG. 27.

In order to pivotally secure the second door 126 to the first door 124, the second door 126 can include bracket 220*a*, 220*b*. The brackets 220*a*, 220*b* can be secured to the second door 126 via rivets 226. Each of the illustrated brackets 220*a*, 220*b* extends downward from the bottom edge of the second door 126 and extends into the first door 124 through the top edge surface 178, as illustrated in FIGS. 28-29. The brackets 220, 220*b* each include an aperture 222*a*, 222*b* and a tab 224*a*, 224*b*. The pivot posts 183*a*, 183*b* of the first door are configured to be arranged within the apertures 222*a*, 222*b* of the brackets 220*a*, 220*b*, allowing the second door 126 to pivot relative to the first door 124. As illustrated in FIGS. 28-29, the tabs 224*a*, 224*b* are configured to abut against the tabs 182*a*, 182*b* of the first door 124 when the second door 126 is pivoted to an open position while the first door 124 remains in a closed position. In one aspect, the tabs 224*a*, 224*b* are configured to prevent the second door 126 from rotating past 90 degrees relative to the first door 124.

The second door 126 may include a handle 202 arranged thereon to facilitate movement of the second door 126 relative to the housing 101 by a user. In one aspect, the handle 202 is positioned at the top edge of the second door 126. However, embodiments where the handle 202 is arranged at another location about the second door 126, such as a side edge, are also within the scope of the disclosure.

Figure 14:
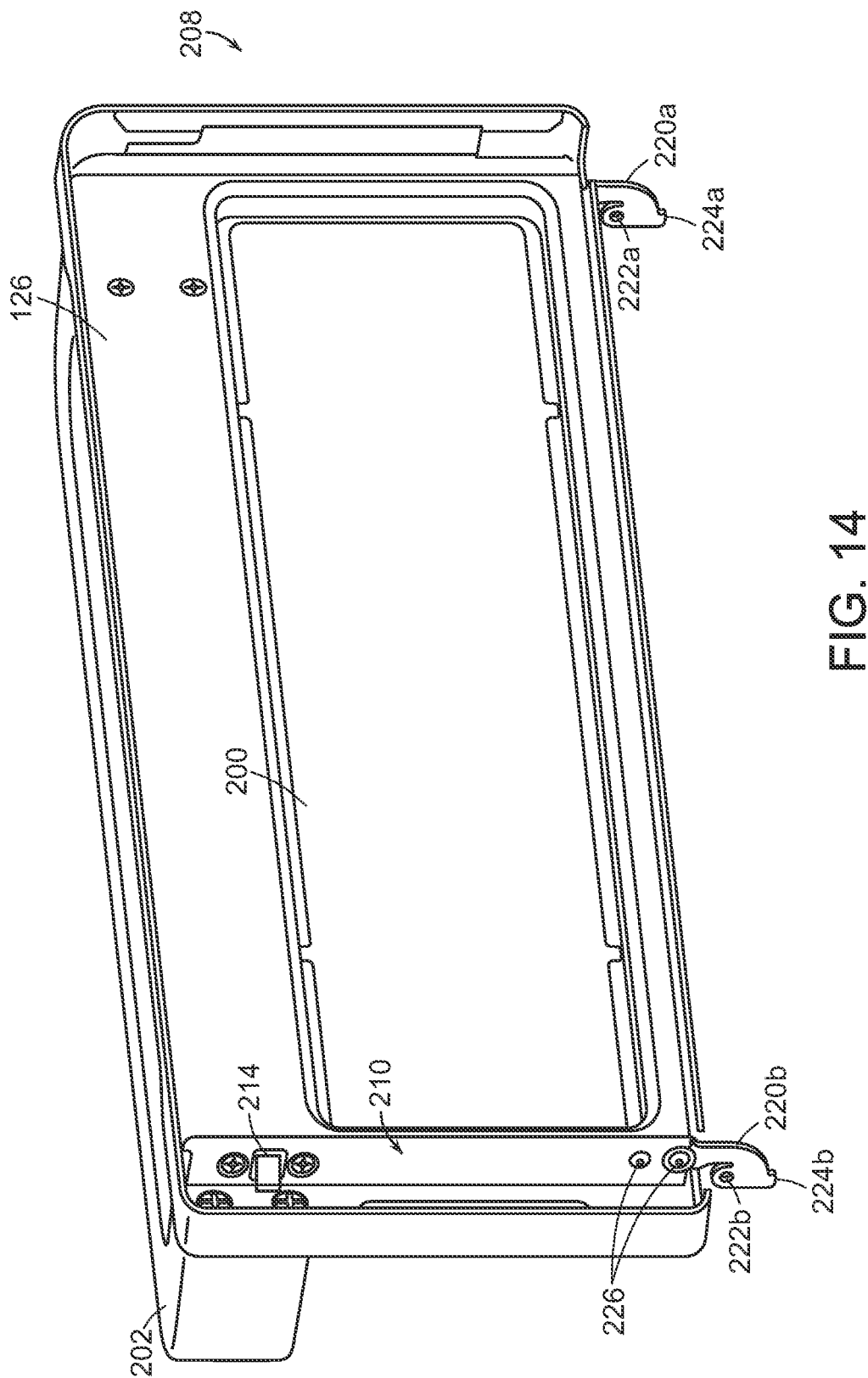
FIG. 14 is rear perspective view of the second door of FIG. 13.
Figure 15:
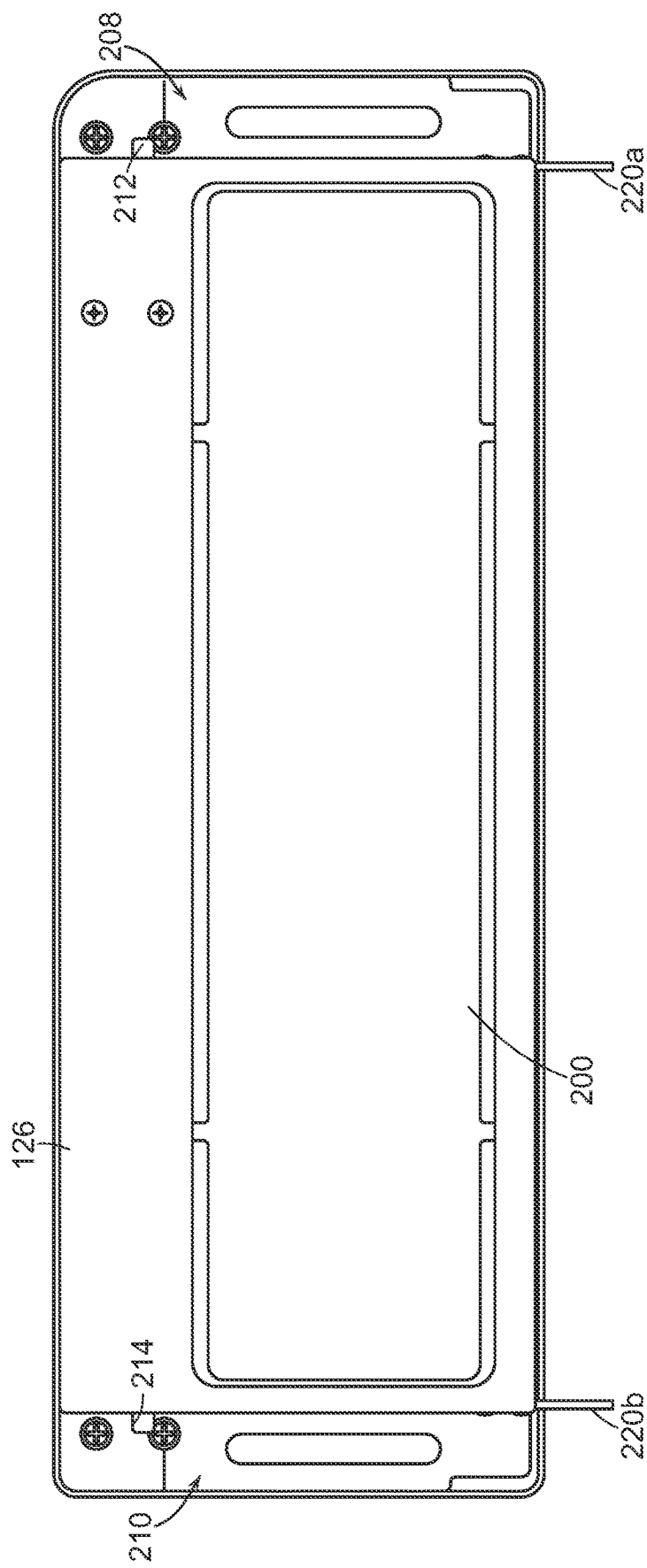
FIG. 15 is a rear view of the second door of FIG. 13.

A release button 204 can be arranged on an outer surface of the handle 202. The release button 204 can be configured to be depressed by a user in order to release the second door 126 from the frame members 170, 171. However, in other embodiments the button 204 can be arranged on an inside surface of the handle 202, or another surface of the second door 126. As illustrated in FIGS. 14-15, the second door 126 include channels 208, 210 arranged on opposite sides of the transparent plate 200. Additionally, in one aspect, the button 204 can be configured such that when the button 204 is depressed, the locking projections will extend in order to connect the second door 126 to the frame members 170, 171 so that the entire door assembly 122 is rotated. A user would access the only the second internal heating compartment 126 by not depressing the button 204 and just applying a rotation to the handle 202 to pivot the small door.

Figure 17:
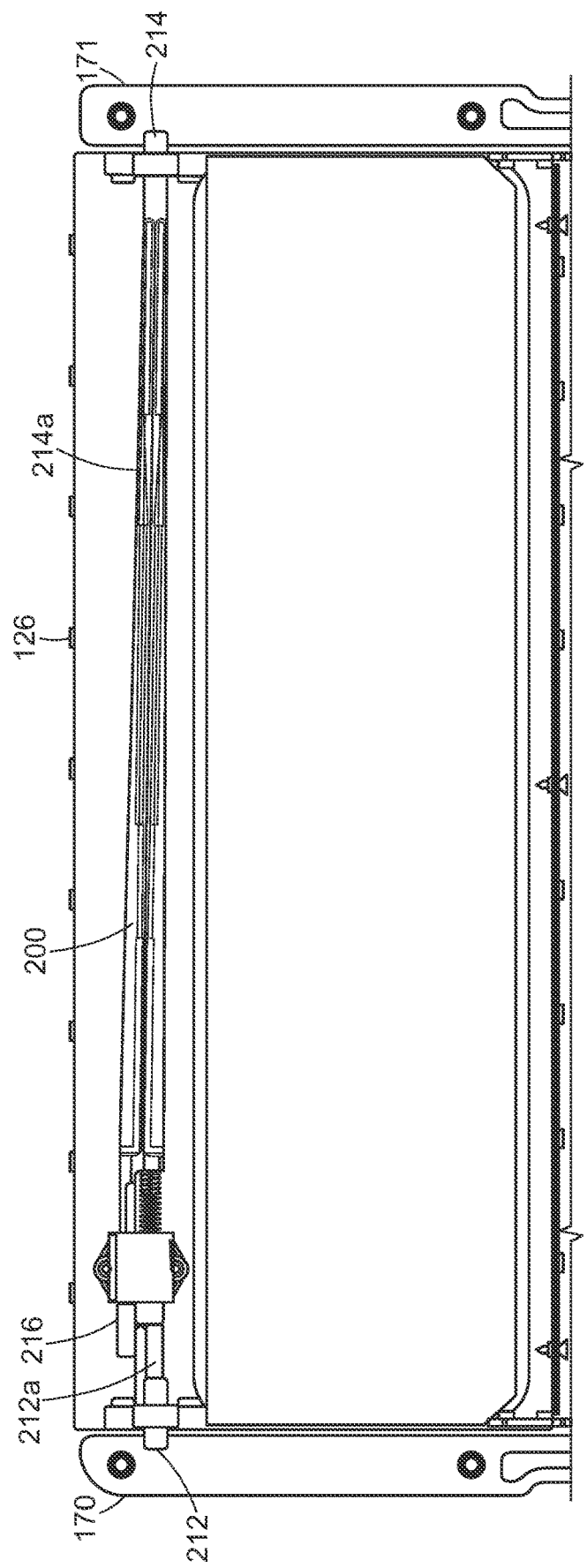
FIG. 17 is a front cross-sectional view of the second door of FIG. 13 taken across line 17-17 and shown secured to frame members.

Similar to channels 179, 180, the channels 208, 210 are configured to receive the frame members 170, 171 to form the door assembly 122. Additionally, the second door 126 includes locking projections 212, 214 positioned within the channels 208, 210. The locking projections 212, 214 are configured to be inserted into the locking apertures 187, 190 of the frame members 170, 171, as illustrated in FIG. 17.

Figure 16:
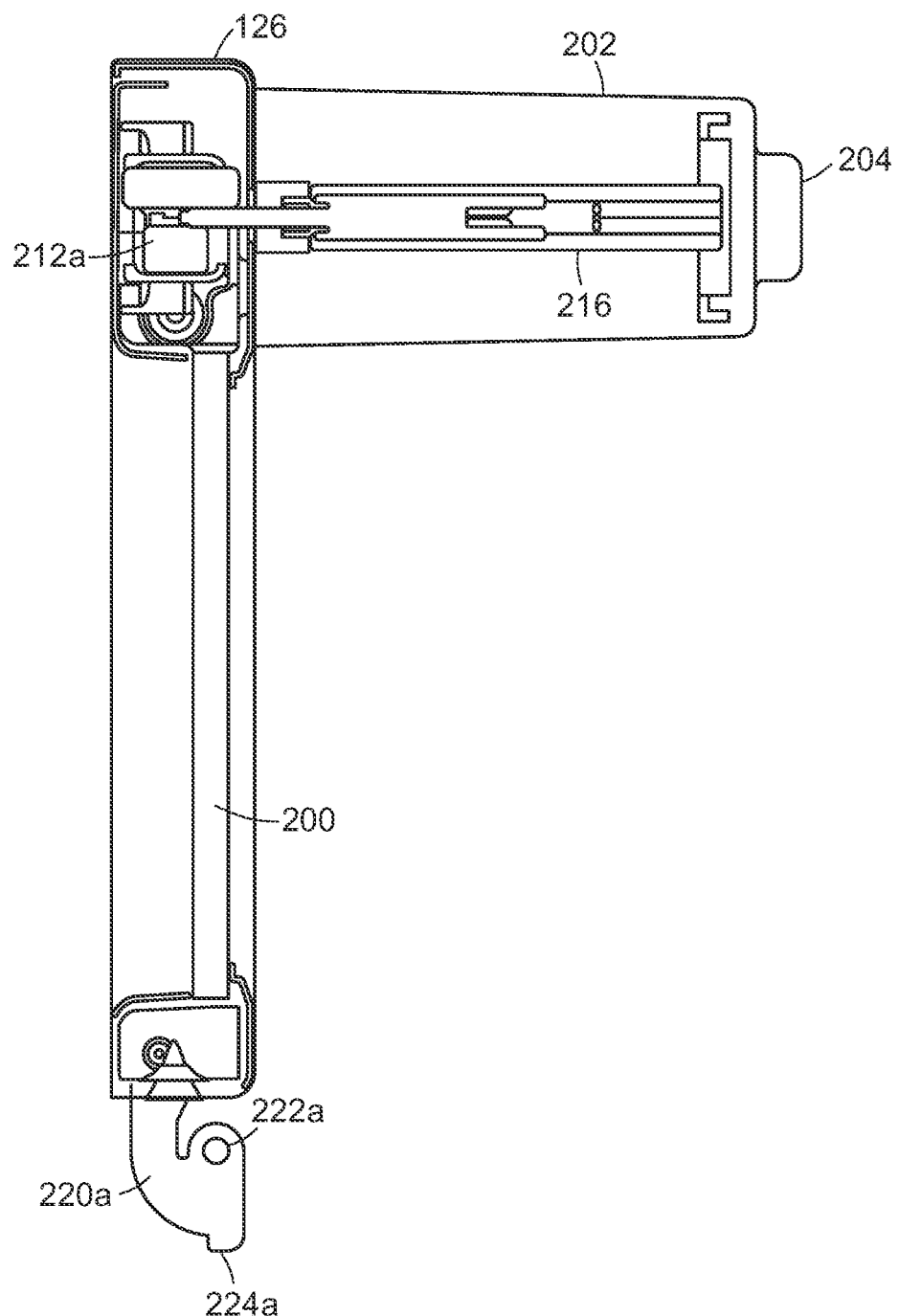
FIG. 16 is a side cross-sectional view of the second door of FIG. 13 taken across line 16-16.

The locking projections 212, 214 are configured to move linearly out of the channels 208, 210 in order to release the locking projections 212, 214 from the locking apertures 187, 190. The release button 204 is connected to the locking projections 212, 214 via an extension member 216 arranged within the handle 202, as illustrated in FIGS. 16-17. As the button 204 is depressed, the extension member 216 is also depressed. The extension member 216 is connected to extensions 212a and 214a, which abut the locking projections 212, 214, such that when the extension member 216 is slid inward within the handle 202, the extensions 212a, 214a are pulled inward, away from the frame members 170, 171, allowing the locking projections 212, 214 to be spring-biased inward and out of the locking apertures 187, 190. Due to an angled surface of the locking projections 212, 214, the locking projections will linearly slide inward and then extend back into the locking apertures 187, 190 when the second door 126 is returned to a closed position. Due to the balance and bias of the door assembly 122, the second door 126 can be opened without moving the first door 124 from the closed position, even though the frame members 170, 171 and the first door 124 are not mechanically locked to the housing 101.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking system comprising:
a housing having a first internal heating compartment with a first opening, a second internal heating compartment with a second opening, a first heating element configured to heat the first internal heating compartment, and a second heating element configured to heat the second internal heating compartment; and
a door assembly having a first door configured to cover the first opening, a second door configured to cover the second opening, and a first frame member extending between the first door and the second door, a second frame member extending between the first door and the second door, wherein the first door is configured to pivot between an open position and a closed position, and the first door being permanently affixed to the first frame member such that the first door cannot move relative to the first frame member, and wherein the second door is pivotally arranged relative to the first door and is configured to selectively allow access to the second internal heating compartment while the first door covers the first opening, wherein the second door selectively locks to the first frame member and the second frame member.

2. The cooking system of claim 1, wherein the second door is positioned vertically above the first door.

3. The cooking system of claim 1, wherein the second door is pivotally connected to the first door.

4. The cooking system of claim 3, wherein the first door includes a tab configured to limit a rotational angle of the second door relative to the first door.

5. The cooking system of claim 3, wherein the second door includes a button configured to selectively release the second door from the first frame member and the second frame member.

6. The cooking system of claim 5, wherein the second door comprises a first locking projection configured to extend into the first frame member, and a second locking projection configured to extend into the second frame member.

7. The cooking system of claim 1, wherein the first frame member and second frame member are separate from the housing.

8. The cooking system of claim 1, wherein the first frame member is positioned within a channel of the first door.

9. The cooking system of claim 8, wherein the first frame member is positioned within a channel of the second door.

10. The cooking system of claim 1, wherein the first frame member and the second frame member are arranged on opposite sides of the first door.

11. The cooking system of claim 10, wherein the first member and the second member extend vertically above a top surface of the first door and are positioned on opposite sides of the second door.

12. The cooking system of claim 1, wherein the first heating element is a convection and/or radiation heating assembly arranged in a chamber positioned adjacent to the first internal heating compartment.

13. The cooking system of claim 1, wherein the second heating element is a convention and/or radiation heating element positioned within the second internal heating compartment.

14. The cooking system of claim 1, wherein the first door is fixedly secured to the first frame member via a plurality of screws passing through apertures of the first frame member.

\* \* \* \* \*